May 10, 1955 M. M. LEVY 2,708,220

MULTI-CHANNEL COMMUNICATION SYSTEMS

Filed Oct. 17, 1950 16 Sheets-Sheet 1

INVENTOR
MAURICE MOISE LEVY
BY [signature]
ATTORNEY

May 10, 1955 M. M. LEVY 2,708,220

MULTI-CHANNEL COMMUNICATION SYSTEMS

Filed Oct. 17, 1950 16 Sheets-Sheet 2

INVENTOR
MAURICE MOISE LEVY

BY [signature]
ATTORNEY

INVENTOR
MAURICE MOISE LEVY
BY [signature]
ATTORNEY

May 10, 1955 M. M. LEVY 2,708,220

MULTI-CHANNEL COMMUNICATION SYSTEMS

Filed Oct. 17, 1950 16 Sheets-Sheet 4

INVENTOR
MAURICE MOISE LEVY
BY
ATTORNEY

May 10, 1955 M. M. LEVY 2,708,220

MULTI-CHANNEL COMMUNICATION SYSTEMS

Filed Oct. 17, 1950 16 Sheets-Sheet 5

INVENTOR
Maurice Moise Levy
BY [signature]
ATTORNEY

MULTI-CHANNEL COMMUNICATION SYSTEMS

Filed Oct. 17, 1950 16 Sheets-Sheet 6

INVENTOR
Maurice Moise Levy
BY [signature]
ATTORNEY

INVENTOR
Maurice Moise Levy
BY [signature]
ATTORNEY

INVENTOR
Maurice Moise Levy
BY [signature]
ATTORNEY

INVENTOR
MAURICE MOISE LEVY
BY [signature]
ATTORNEY

May 10, 1955 M. M. LEVY 2,708,220

MULTI-CHANNEL COMMUNICATION SYSTEMS

Filed Oct. 17, 1950 16 Sheets-Sheet 10

INVENTOR
Maurice Moise Levy
BY [signature]
ATTORNEY

May 10, 1955 M. M. LEVY 2,708,220

MULTI-CHANNEL COMMUNICATION SYSTEMS

Filed Oct. 17, 1950 16 Sheets-Sheet 11

INVENTOR
Maurice Moise Levy
BY [signature]
ATTORNEY

INVENTOR
Maurice Moise Levy
BY [signature]
ATTORNEY

May 10, 1955 M. M. LEVY 2,708,220

MULTI-CHANNEL COMMUNICATION SYSTEMS

Filed Oct. 17, 1950 16 Sheets-Sheet 13

INVENTOR
Maurice Moise Levy
BY
ATTORNEY

INVENTOR
Maurice Moise Levy
BY [signature]
ATTORNEY

INVENTOR
MAURICE MOISE LEVY
BY [signature]
ATTORNEY

INVENTOR
MAURICE MOISE LEVY
BY
[signature]
ATTORNEY

United States Patent Office 2,708,220

Patented May 10, 1955

2,708,220

MULTI-CHANNEL COMMUNICATION SYSTEMS

Maurice Moïse Levy, Ottawa, Ontario, Canada, assignor to The General Electric Company Limited, London, England Application October 17, 1950, Serial No. 190,533

Claims priority, application Great Britain October 26, 1949

12 Claims. (Cl. 179—15)

The present invention relates to multi-channel communication systems and is concerned with, for example, telecommunication systems in which two exchanges are connected to one another by several channels which may be constituted, for example, by several lines respectively, or by the several channels of a multi-channel, time-sharing pulse communication system.

In establishing a call between two subscribers connected to the two exchanges respectively, it is necessary first of all to identify a free one of the channels connecting the two exchanges to one another. In order to enable this to be done, a number of voltages equal to the number of channels, and having predetermined different characteristics identified with the several channels respectively, may be generated. These voltages may be characterised, for example, by their times of occurrence, their amplitudes, their frequencies, or their phases relatively to one another. All of these voltages may be applied to a device, which may be referred to as an interrogating circuit, adapted to respond to engaged conditions in the several channels respectively and to permit only those voltages identified with the free channels to appear at an input terminal of the device. If the voltages are characterised otherwise than by their times of occurrence then means are provided to ensure that the voltages representative of the free channels appear at the output terminal of the interrogating circuit in succession.

In the specification of co-pending U. S. application Ser. No. 247,072, Chubb and Levy, filed September 18, 1951, for Telecommunication Systems Embodying Automatic Exchanges, the owner of which is the assignee of the present application, there is described an automatic exchange in which a fixed plurality of communication channels is provided. In response to a calling signal from apparatus such as a telephone, a teleprinter or telemetering apparatus, hereinafter generally referred to as a calling subscriber, a free one of the channels is selected and a signal is transmitted to the terminal equipment of the called subscriber (the called subscriber may be a telephone, teleprinter, telemetering equipment or other apparatus), to identify the selected channel. The signals identifying the several channels may be voltages characterised, for example, by their times of occurrence, their amplitudes, their frequencies or their phases relatively to one another as in the system first described. Where the voltages are characterised otherwise than by their times of occurrence, suitable means are provided to ensure that two such voltages cannot appear simultaneously at the terminal equipment of the called subscriber.

From the foregoing description it will be seen that a requirement arises for apparatus capable of reading the channel number of the first channel-identifying voltage applied thereto and for establishing a connection with that channel.

An object of the present invention is to provide apparatus whereby the aforesaid requirement can be met.

According to the present invention, in a multi-channel communication system in which the several channels are identified by voltages of predetermined different characteristic, the voltages if characterised otherwise than by their times of occurrence being made available in succession, apparatus, capable of being made operative and inoperative by a calling subscriber, is provided for reading the number of the channel identified by the first of the channel-identifying voltages applied to the apparatus after the apparatus is made operative, and for establishing a connection with this channel, the apparatus comprising a lock circuit adapted to pass to a control circuit, the first of the channel-identifying voltages applied to the lock circuit and no other, or a voltage having characteristics related to those of the first of the channel-identifying voltages applied to the lock circuit, the control circuit comprising one or more groups of switch devices arranged in such a manner that only one switch device in each group becomes operated in response to the voltage passed from the lock circuit to the control circuit, different ones or different combinations of the switch devices being responsive to the voltages of different characteristics in order to identify the channel number of the voltage passed to the control circuit, and the switch devices being adapted, when operated, to apply control voltage to a further switch device, the control voltage being such as to cause the further switch device to establish a connection with the channel identified by the control circuit.

The further switch device may be a mechanical selector switch having a moving contact and several fixed contacts, the latter being connected to the several channels respectively. The control circuit may then be arranged to apply a direct voltage to the further switch device to determine the setting of the moving contact.

Alternatively, and particularly but not exclusively, when the several channels are constituted by voltages of predetermined different characteristic, the further switch device may comprise a modulator. For example, if the several channels are constituted by time-sharing pulse trains, the control circuit may be arranged, when operated, to apply the pulse train of the identified channel to a control electrode of a valve forming part of the modulator. The valve may, for example, be arranged to be non-conducting except when a suitable pulse is applied to the control electrode. The pulses of anode current in the valve can be modulated and hence a connection established with the identified channel. Likewise when the channel-identifying voltages are characterised by their frequencies, the further switch device may be arranged to apply the oscillation of the identified channel to a control electrode of an electron discharge valve to cause a current of the same frequency to flow in the valve. This current can be modulated and hence a connection established with the identified channel.

Where the several channels are constituted by voltages of predetermined different characteristics the channel-identifying voltages may be of the same characteristics respectively. On the other hand it may be found convenient to use different characteristics for the channel-identifying voltages from those used for the channels themselves. For example, it may be found convenient to use time-sharing pulses for the channel-identifying voltages of a recurrence frequency of say 50 C./S. or less. Such a recurrence frequency would, however, be too low to carry intelligence in the form of say speech or music. The channels themselves may then be constituted by time-sharing pulses having a recurrence frequency of some thousands of cycles per second. If, however, the several channels are only required to carry intelligence of a relatively low frequency, such as, for example, dialling impulses at a frequency of 10 P. P. S. in an automatic telephone system, 50 C./S. would be adequate.

When the control circuit comprises only one group of switch devices the number of switch devices therein is made equal to the number of channels. Each of these switch devices may have two input terminals and may be adapted to operate only when two suitable voltages are applied simultaneously to the two input terminals respectively. The channel identifying voltages may be applied to one of the input terminals of these switch devices respectively and the other input terminals may be connected together and to the output of the lock circuit. Where the channel-identifying voltages are time-sharing pulses the said other input terminals may be connected directly to the output of the lock circuit.

Each of the switch devices in the control circuit may comprise a gas-filled electron discharge valve having a control electrode, the two input terminals of the switch device being connected to the control electrode of the valve through a circuit arranged in such a manner that the valve strikes, in response to voltage applied to the input terminals, only when voltages of suitable magnitude and polarities appear on the two input terminals simultaneously.

In a preferred arrangement for use when the system has $m$ channels and the channel-identifying voltages are pulses of different times of occurrence, the control circuit comprises $n$ groups of switch devices where $n$ is an integer greater than one, a first of the groups comprising $p$ switch devices, and a second of the groups comprising $m/p$ switch devices, where $p$ and $m/p$ are each integers greater than one and may be equal, the first input terminal of each switch device in the groups is connected to the output of the lock circuit, means are provided for generating $n$ groups of pulse trains, the trains of each group being interlaced with one another, a first of the groups of pulse trains comprising $p$ trains each at a recurrence frequency $f$ and a second of the groups of pulse trains comprising $m/p$ trains each of a recurrence frequency of $f/p$, each of the pulses in the first group of trains having a width comparable with the width of the channel-identifying pulses and each pulse in the second group of trains having a width comparable with the time occupied by $p$ successive pulses in the first group and, in operation, the pulse trains of the first group are applied to the second input terminals of the switch devices respectively in the first group, and the pulse trains of the second group are applied to the second input terminals of the switch devices respectively in the second group.

The invention will now be described by way of example with reference to the accompanying drawings, in which.

Figure 18:
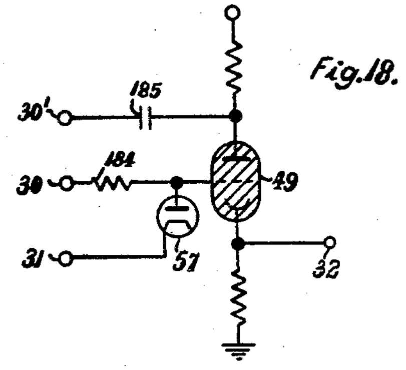
Figure 19:
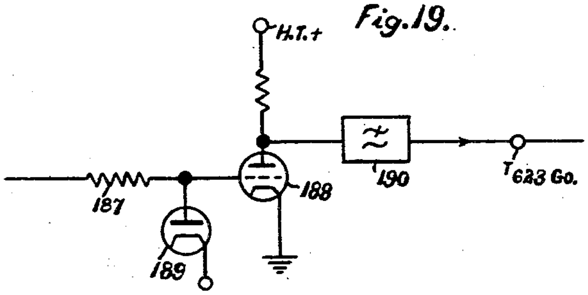
Figure 17:
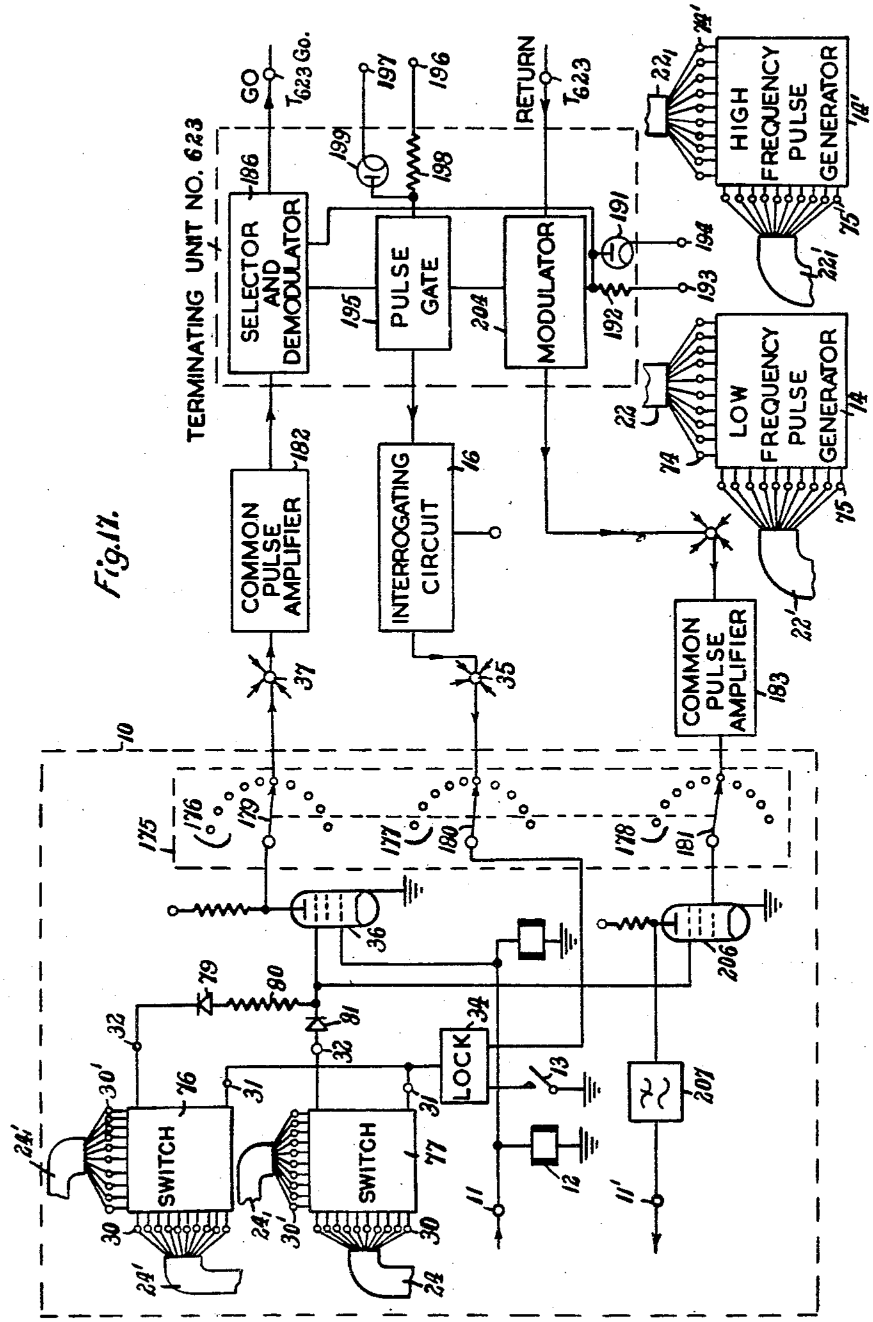
Figure 20:
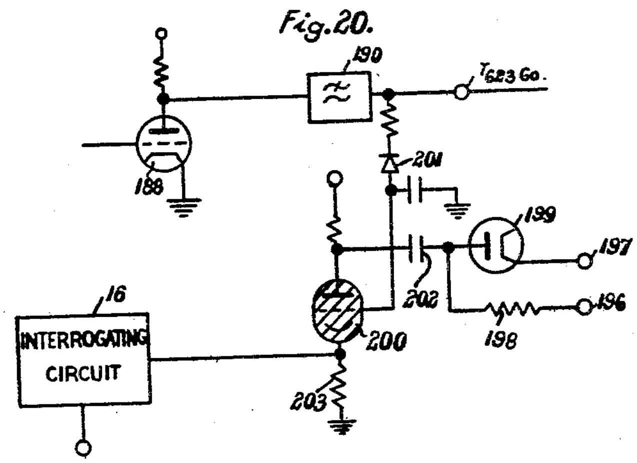
Figure 21:
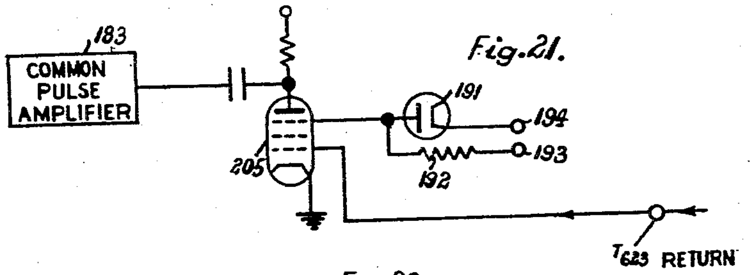
Figure 23:
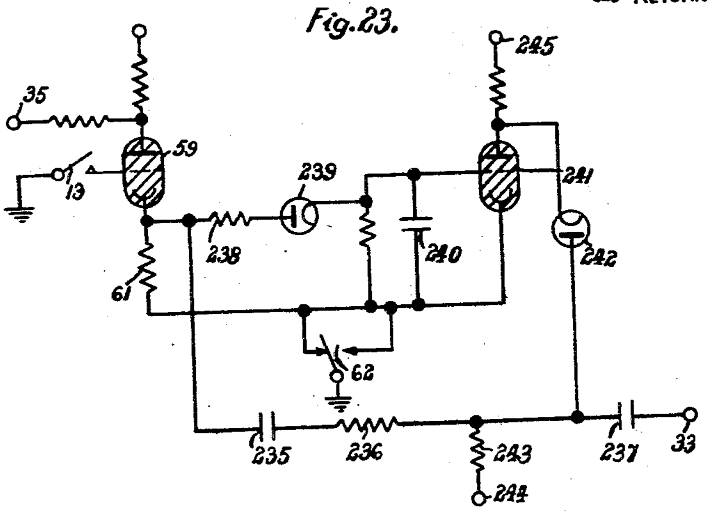
Figure 22:
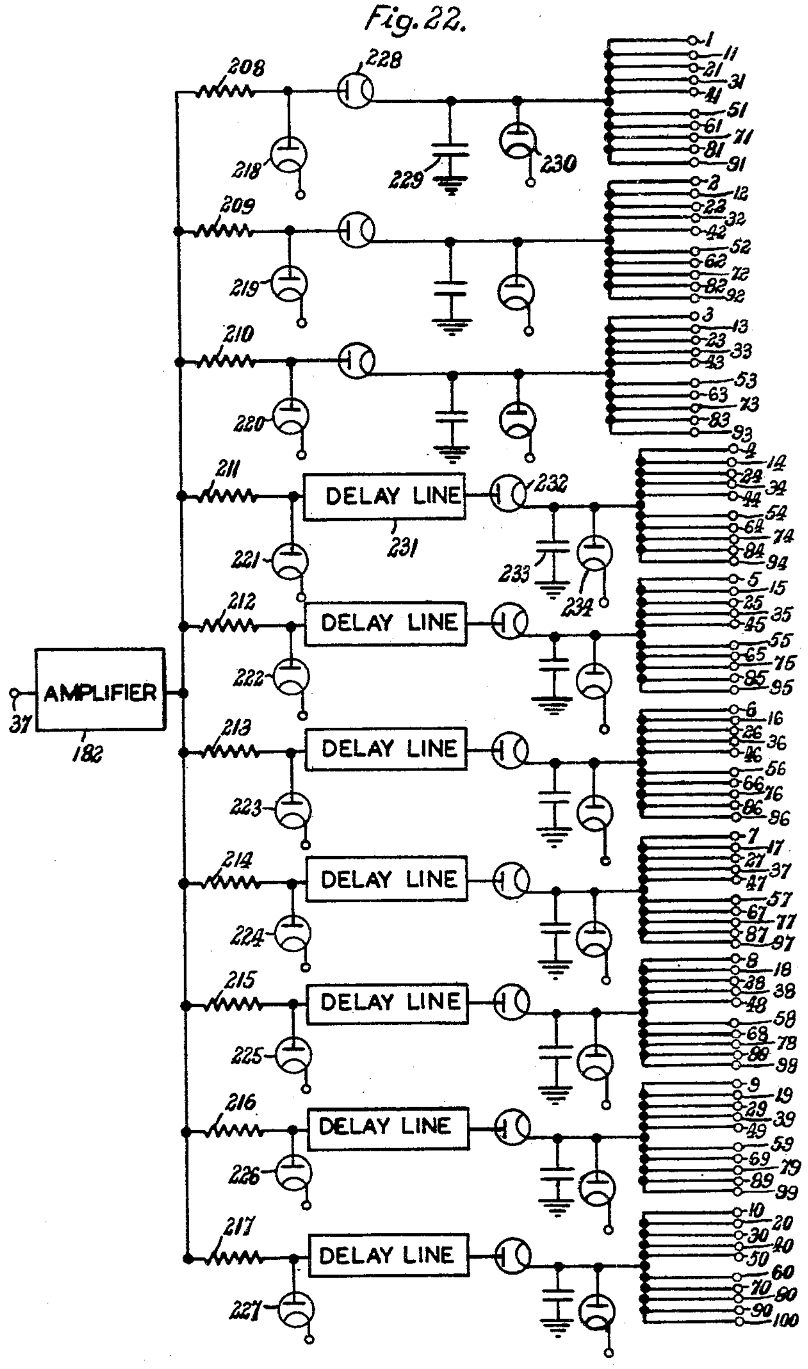
Figure 25:
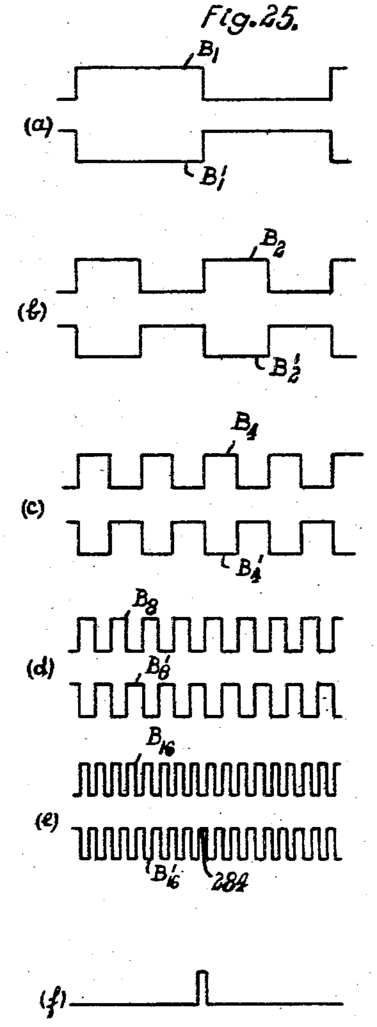
Figure 24:
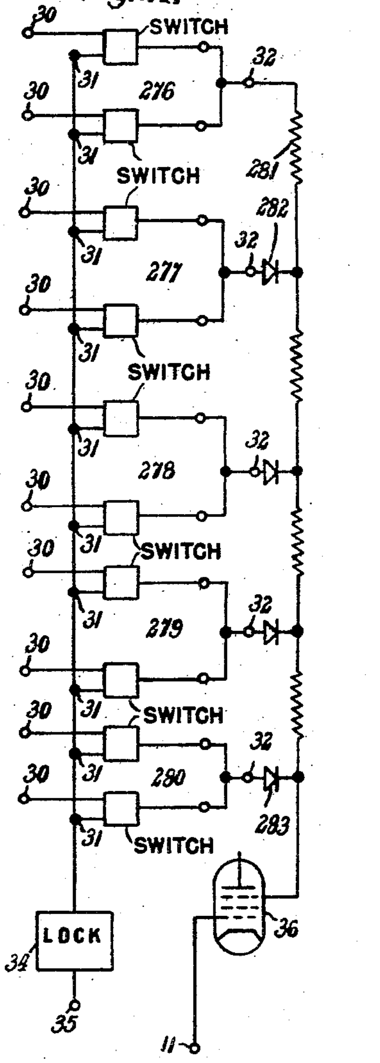
Figure 26:
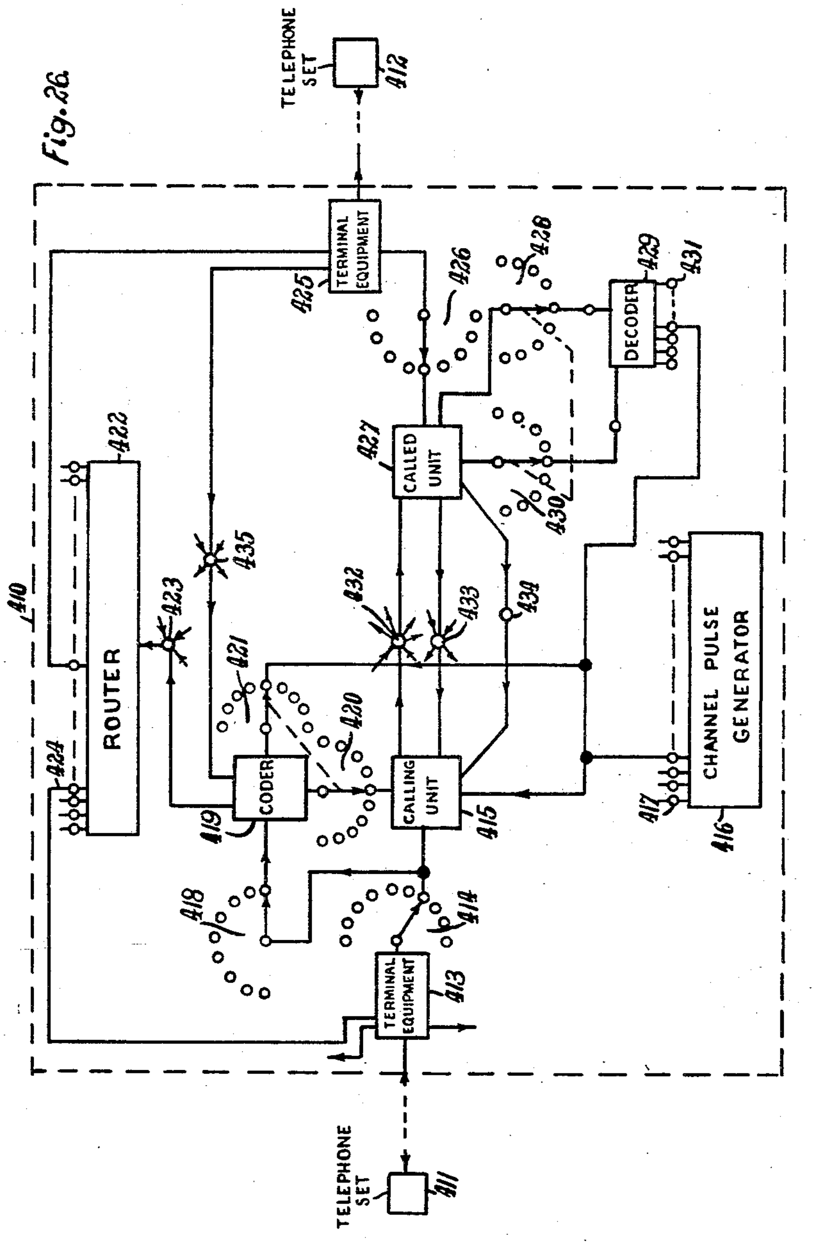
Figures 27, 28:
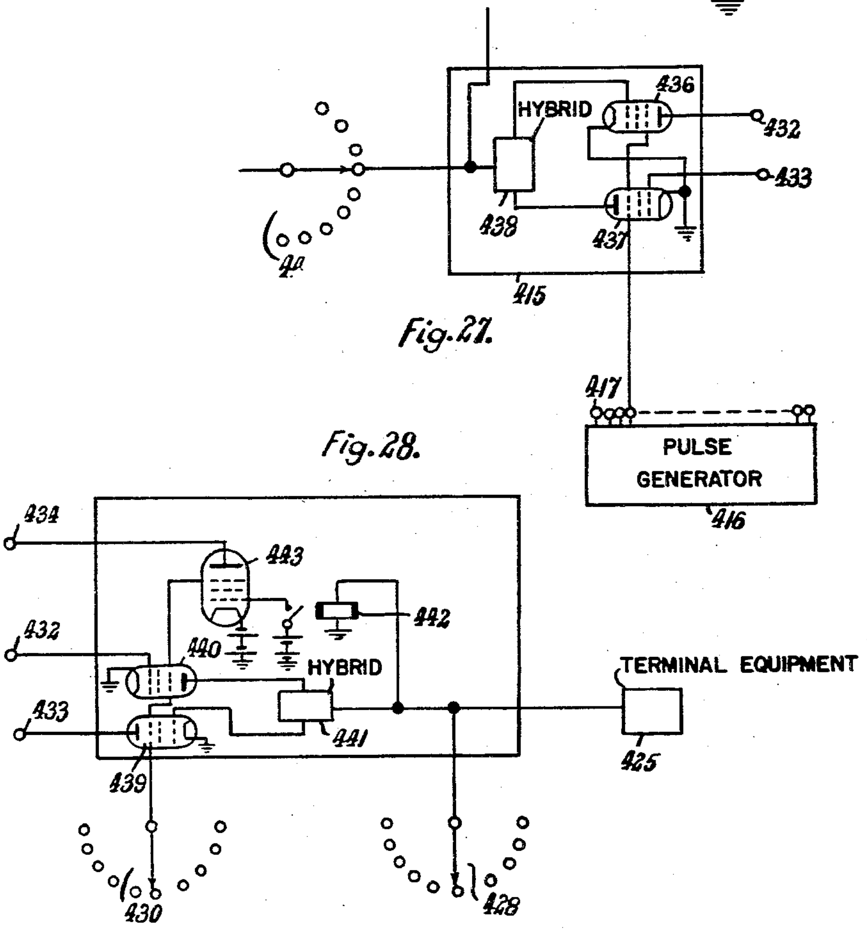

Figure 17 is a block schematic diagram of a further telephone exchange embodying apparatus according to the invention, Figure 18 is a circuit diagram of a switch device suitable for use in the arrangement of Figure 17, Figure 19 is a circuit diagram of a channel pulse selector and demodulator suitable for use in the arrangement of Figure 17, Figure 20 is a circuit diagram of a pulse gate shown in block form in Figure 17, Figure 21 is a circuit diagram of a modulator shown in block form in Figure 17, Figure 22 shows a modification of the arrangement of a part of Figure 17, Figure 23 is a circuit diagram of a further lock circuit, Figure 24 is a block schematic diagram of an alternative arrangement of part of Figure 1, 5, 7 or 17, Figure 25 is an explanatory diagram, Figure 26 is a block diagram of a further automatic exchange embodying apparatus according to the invention, Figures 27 and 28 are circuit diagrams of parts shown in block form in Figure 26.

Figure 29:
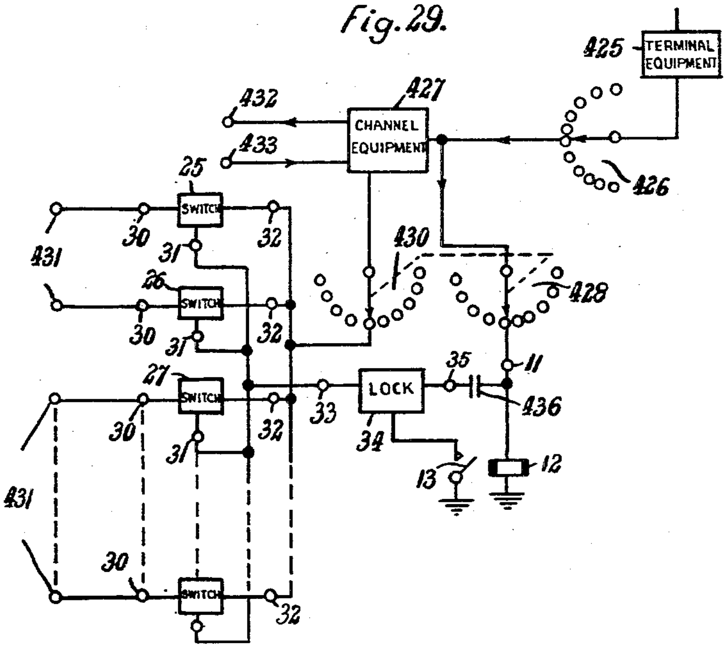
Figure 32:
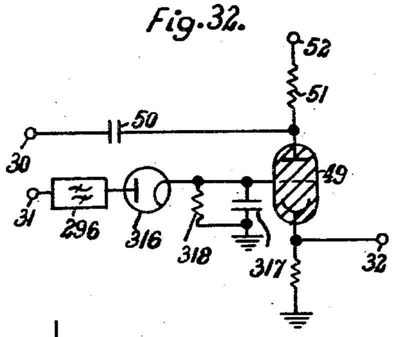
Figure 30:
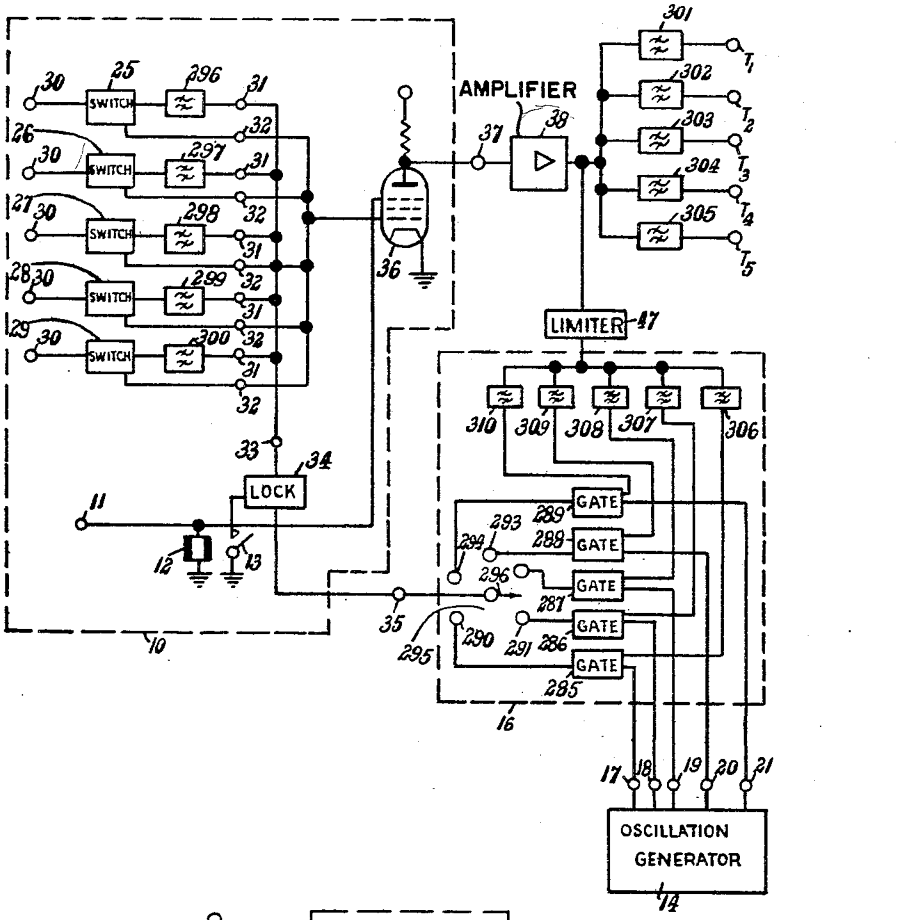
Figure 31:
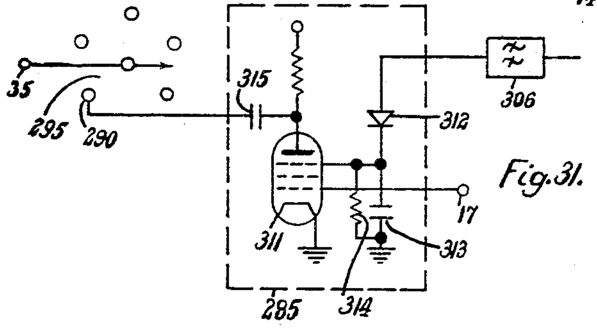

Figures 29 and 30 are block schematic diagrams of two further embodiments respectively of the invention, and Figures 31 and 32 are theoretical circuit diagrams of two parts respectively shown in block form in Figure 30.

Throughout the drawings switching and relay arrangements have been shown in simple form for convenience only. Other arrangements will be apparent to those skilled in the art.

Figure 1:
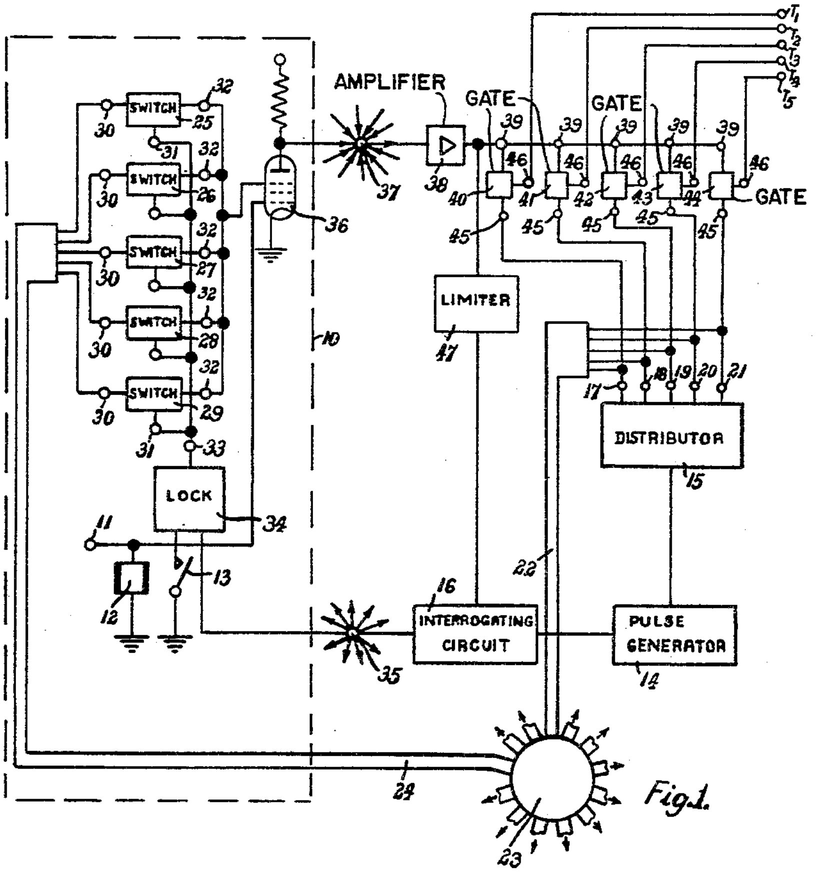
Figure 1 is a block schematic diagram of a part of a telephone exchange embodying apparatus according to the invention.

Referring to Figure 1, this is a block schematic diagram of part of a telephone exchange which is connected to a second telephone exchange (not shown) by five lines terminated at terminals $T_1$ to $T_5$ respectively. Each switch-board operator in the telephone exchange shown is provided with a jack (not shown) connected to a unit which will be hereinafter referred to as an incoming unit and will be described later. It will be assumed that there are ten operators and hence ten incoming units. One incoming unit is shown within a broken line 10, the operator's jack for this unit being connected to a terminal 11. The other nine incoming units are identical with that shown within the broken line 10 in Figure 1.

On a connection being made to the terminal 11 by way of the operator's jack, a relay winding 12 is energised closing relay contacts 13, and starting a sequence of events which, assuming one of the five lines to be free, results in the terminal 11 being connected, within a small fraction of a second, to one of the terminals $T_1$ and $T_5$ not already in use.

In order to achieve this result a generator 14 is provided to generate five interlaced pulse trains, the five pulse trains being identified with the five lines connected to the terminals $T_1$ and $T_5$ respectively. The output of the generator 14 is applied to a suitable distributor 15 and to a unit 16 which will hereinafter be referred to as an interrogating circuit and will be described later. The five pulse trains appear at five output terminals 17 to 21 respectively of the distributor and are applied through a five-core-cable 22, junction box 23, and a further five-core-cable 24 to the incoming unit 10. The five pulse trains are also applied to the other nine incoming units by cables branching from the junction box 23.

The unit 10 includes five switch devices 25 to 29, to be described later, each switch device having two input terminals 30 and 31 respectively and an output terminal 32. The five switch devices constitute an example of the aforesaid control circuit. Each of the switch devices 25 to 29 is adapted to remain open until a pulse from one of the pulse trains is applied to both its input terminals simultaneously. The five cores of the cable are connected to the five input terminals 30 respectively, whereby the five pulse trains identified with the five lines are applied to the input terminals 30 of the five switch devices respectively whereby these five switch devices also become identified with the five outgoing lines respectively. The other input terminals 31 are connected by a common lead to the output terminal of a lock circuit 34 to be described later. The output of the interrogating circuit 16 is applied through an output terminal 35 to the lock circuit 34 which serves to allow only one pulse to pass therethrough, this pulse being the first to occur in the output of the interrogating circuit after the contacts 13 close. The output terminal 35 of the interrogating circuit is also connected to the lock circuit of the other nine incoming units.

After the contacts 13 close, therefore, only one of the switch devices 25 to 29 closes. The switch device which closes is that to whose input terminal 30 is applied the pulse train containing a pulse coincident with the single pulse passed by the lock circuit 34 and hence applied to the parallel connected input terminals 31. As will be described later, it is arranged that the output of the interrogating circuit 16 contains only those pulse trains which are identified with the terminals $T_1$ to $T_5$ not in use. Whichever of the switch devices 25 to 29 is operated indicates, therefore, one of the terminals $T_1$ to $T_5$ identified by the interrogating circuit as being free.

It is arranged that when any one of the switch devices 25 to 29 closes the pulses applied to its input terminal 30 are transmitted to its output terminal 32. All the output terminals 32 are connected together and to the suppressor grid of a pentode valve 36. Suitable bias is applied to the pentode 36 to render it non-conducting until the pulses from one of the terminals 32 are applied to the suppressor. It will be seen that the terminal 11 is connected to the control grid of the pentode 36, and hence any voltages applied to the terminal 11 amplitude modulate the pulses of anode current flowing in the valve 36.

The anode of the valve 36 is connected to an output terminal 37 and the modulated pulses are applied through an amplifier 38 to the input terminals 39 of five gates 40 and 44 respectively. It is arranged that each of these gates remains closed except when there is applied, simultaneously to the input terminal 39 and a second input terminal 45, a pulse from the same pulse train. The five input terminals 45 are connected to the five output terminals 17 to 21 respectively of the distributor 15. When a pulse train appears on the parallel-connected input terminals 39 the only one of these gates which opens is that to whose input terminal 45 is applied the corresponding pulse train directly from the terminals 17 to 21. When one of the gates 40 to 44 opens the pulses applied to its input terminal 39 are transmitted to an output terminal 46. The five output terminals 46 are connected to the five line terminals $T_1$ to $T_5$ respectively.

The output from the pentodes 36 in the other nine incoming units is also applied to the terminal 37, and hence whenever one of these units is in use one of the five pulse trains appears at the terminal 37 and, therefore, in the output of the amplifier 38. The output of the amplifier 38, in addition to being applied to the terminals 39 of the gates 40, is applied through a limiter 47 to the interrogating circuit 16. It is arranged that a pulse train applied to the interrogating circuit from both the limiter 47 and the generator 14 does not appear at the output terminal 35. It may be arranged, for example, that the pulses applied from the limiter are of the same amplitude but oppose those applied from the generator 14 whereby cancellation is effected.

Summarising the action of the circuit of Figure 1, assuming that at least one of the terminals $T_1$ to $T_5$ is free, when the contacts 13 close the next succeeding pulse in the output of the interrogating circuit passes through the lock circuit 34 and causes operation of that one of the switch devices 25 to 29 to whose input terminal 30 is applied the pulse train containing a pulse coincident with the pulse passed by the lock circuit 34. This pulse train is then passed through the valve 36 and amplifier 38 to the interrogating circuit 16 in order to suppress this pulse train from the output of the interrogating circuit, whereby a subsequent call through one of the other nine incoming units cannot receive an indication that the line identified by this pulse train is free. The output of the amplifier also passes through the appropriate one of the gates 40 to 44 to the line identified as being free by the pulse passed by the lock device 34. The pulse train passed to the free line may be modulated, say by speech or dialling pulses, and a low-pass filter may be included between each of the gates 40 to 44 and the terminals $T_1$ to $T_5$ respectively.

Figure 2:
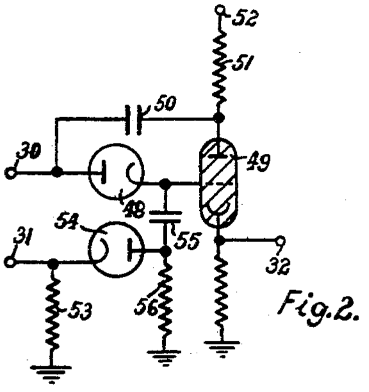
Figures 2 and 3 are circuit diagrams of switch devices suitable for use in a control circuit shown in block form in Figure 1.

Referring to Figure 2, this shows one possible circuit of each of the switch devices 25 to 29 of Figure 1. The input terminal 30 is connected to the anode of the diode 48 whose cathode is connected to the control grid of a gas-filled triode 49, preferably of the cold-cathode type. The input terminal 30 is also connected through a capacitor 50 to the anode of the valve 49 which is connected through a resistor 51 to the positive terminal 52 of a source (not shown) of high tension voltage whose negative terminal is earthed. The cathode load of the valve 49 may, if preferred, be connected to a point of negative potential. The input terminal 31 is connected to earth through a resistor 53 and to the cathode of a diode 54 whose anode is connected through a capacitor 55 to the control grid of the valve 49. The anode of the diode 54 is also connected to earth through a resistor 56. It is arranged that the pulses applied to the terminal 30 from the distributor 15 (Figure 1) are positive-going and that the pulses applied to the terminal 31 from the lock circuit 34 (Figure 1) are negative-going, and it will be assumed that it is necessary to make the voltage on the control grid of the valve 49, 60 volts positive relatively to the cathode for a period of at least twenty micro-seconds before the valve strikes. It is arranged that the amplitude of the pulses applied to the terminals 30 and 31 are each 50 volts, and that the time constant of the capacitor 55 and resistor 56 is long compared with the repetition period of the pulses in the five pulse trains.

Assuming first of all that pulses are applied to the terminal 30 and not to the terminal 31. The capacitor 55 becomes charged to 50 volts making the control grid of the valve 50 volts positive and because of the long time constant of the capacitor 55 and resistor 56 this voltage is maintained at substantially 50 volts which is ten volts below the striking voltage of the valve 49. Assuming now that a negative-going pulse appears at the terminal 30 simultaneously with a positive-going pulse at the terminal 31, the potential difference between the two terminals 30 and 31 is 100 volts, both diodes 48 and 54 conduct and the capacitor 55 becomes charged to 100 volts. This charge is held in the capacitor 55 for a period of time substantially exceeding 20 micro-seconds and hence the valve strikes. Subsequent pulses applied to the terminal 30 are transmitted through the valve 49 to the output terminal 32. It will be appreciated, therefore, that this arrangement will function irrespective of whether the duration of the pulses is longer or shorter than 20 micro-seconds.

Figure 3:
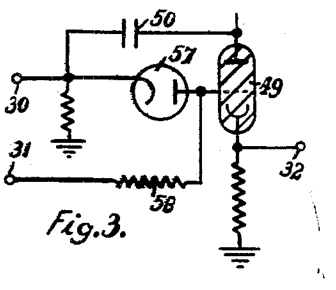

Referring to Figure 3, this shows a simplified form of the arrangement of Figure 2 for use when the duration of the pulses exceeds 20 micro-seconds. In this arrangement the input terminal 30 is connected to the cathode of a diode 57 whose anode is connected to the control grid of the valve 49. The terminal 31 is connected to the control grid through a resistor 58. It is arranged that pulses applied to both terminals 30 and 31 are postive-going and of an amplitude of 70 volts. Assuming that a pulse is applied to the terminal 31 in the absence of a pulse at the terminal 30, the diode 57 conducts and it is arranged that the consequent voltage drop across the resistor 58 is 20 volts whereby the voltage on the control grid of the valve 49 is 10 volts below striking level. If two pulses are applied simultaneously to the two terminals 30 and 31 respectively however, the diode remains insulating and the full 70 volts are applied from the terminal 31 to the control grid of the valve 49. As the duration of the pulse is in excess of 20 micro-seconds the valve strikes and subsequent pulses applied to the terminal 30 are transmitted through the capacitor 50 and the valve 49 to the output terminal 32.

Figure 4:
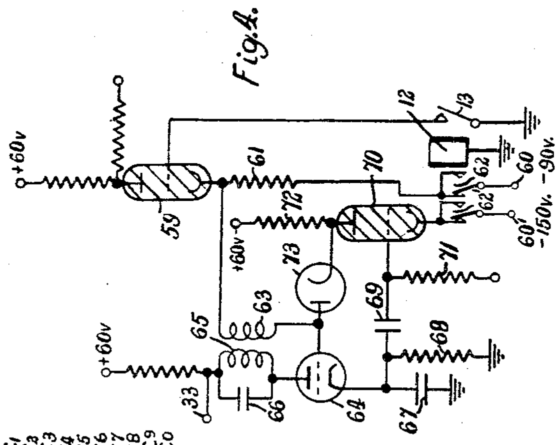
Figure 4 is a circuit diagram of a lock circuit suitable for use in the arrangement of Figure 1.

Referring to Figure 4, this shows one arrangement of the lock circuit of Figure 1. The terminal 35 is connected to the anode of a gas-filled triode 59 whose control grid is connected to earth through the contacts 13. The cathode of the valve 59 is connected to a terminal 60 at a potential of −90 volts through a cathode resistor 61 and contacts 62, the latter being normally closed except for a brief period when the relay winding 12 is being energised or de-energised. Until the winding 12 is energised the cathode of the valve 59 is at −90 volts but as the control grid is not connected to earth or any other point of suitable fixed potential the valve does not strike. When the winding 12 is energised, however, the grid of the valve 59 is earthed and hence the valve strikes. As a result of anode current flowing in the resistor 61 the potential of the cathode of the valve 59 rises to −10 volts. The cathode of the valve 59 is connected through a coil 63 to the control grid of a triode 64 forming part of a blocking oscillator. The anode circuit of the triode 64 contains a coil 65 connected in parallel with a capacitor 66 to form a tuned circuit, the coil 65 being tightly coupled to the coil 63 in the grid lead. The cathode lead of the triode 64 includes a capacitor 67 connected in shunt with a resistor 68.

When the cathode of the valve 59, and hence the control grid of the valve 64, is at −90 volts the blocking oscillator cannot oscillate. When the valve 59 is struck the blocking oscillator still cannot oscillate but its grid potential is raised to −10 volts and it is arranged that the pulses applied to the terminal 35 are positive-going and of substantial amplitude whereby the first pulse appearing at the terminal 35 after the tube 59 has struck raises the potential of the grid of the valve 64 to a positive value whereby the blocking oscillator goes into oscillation.

Towards the end of the first half-cycle of oscillation the oscillator is blocked by the charge in the capacitor 67 and hence only one pulse appears at the output terminal 33. The width of this pulse is determined by the values of the components in the oscillator. The positive pulse appearing at the cathode of the valve 64 is applied through a capacitor 69 to the control grid of a gas-filled cold-cathode triode 70 whose grid is normally biased at −30 volts through a resistor 71. The cathode of this valve is connected through relay contacts 62′ to a terminal 60′ at −150 volts potential. When the positive pulse is applied to the control grid of the valve 70, this valve strikes and anode current flowing through a load resistor 72 causes a voltage drop reducing the anode potential of the valve 70 to about −20 volts. This potential is applied through a diode 73 to the control grid of the triode 64 and hence prevents the blocking oscillator from responding to further pulses applied thereto from the terminal 35. These conditions remain until the relay winding 12 is de-energised, at say the end of a telephone conversation, causing the contacts 62 to be momentarily opened whereby the valves 70 and 59 are both extinguished. It may be arranged that each pulse generated by the blocking oscillator is longer than the pulses appearing at the terminal 35 but not more than twice as long.

Figures 5, 6:
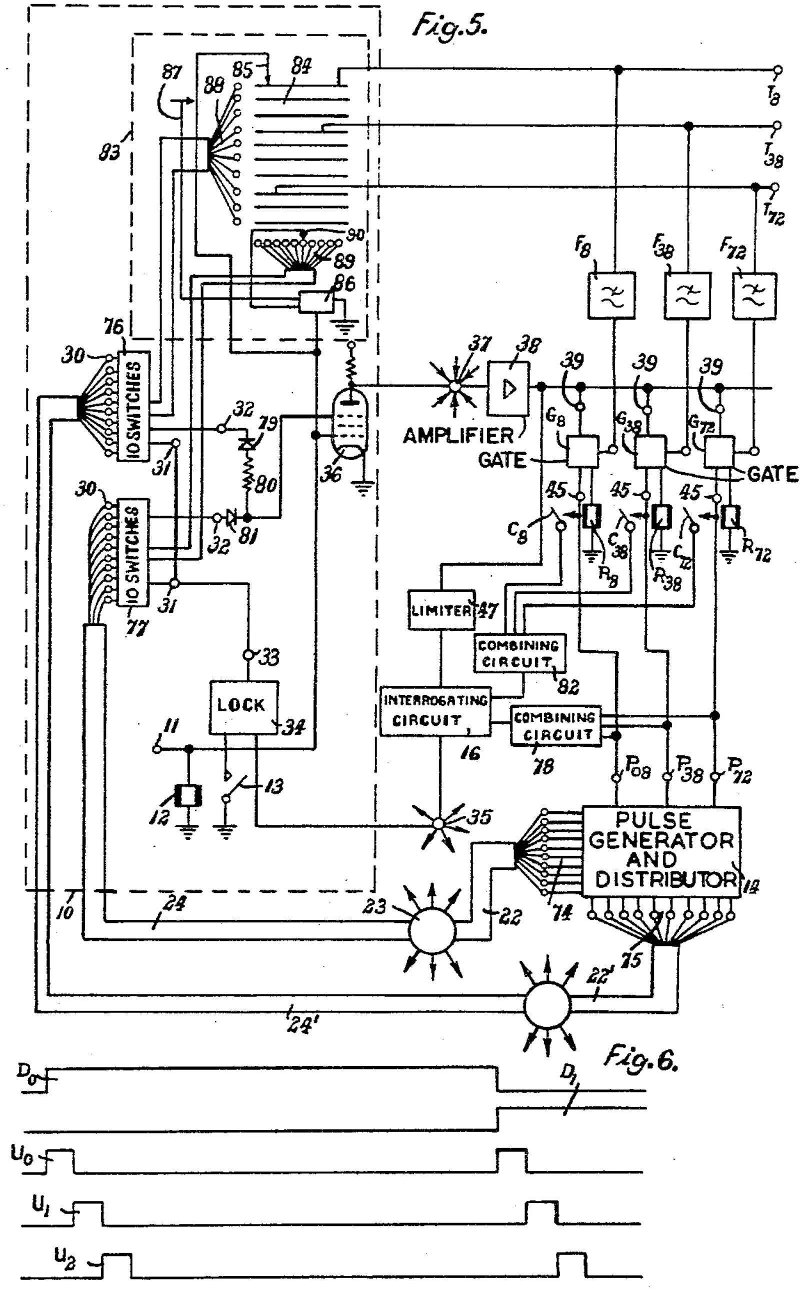
Figure 5 is a schematic diagram of a second telephone exchange embodying apparatus according to the invention.
Figure 6 is an explanatory diagram.

Referring now to Figure 5, this is a block schematic diagram of part of a telephone system in which two stations are connected by a hundred channels. The channels are terminated at one of the stations at 100 terminals of which only three—$T_8$, $T_{38}$ and $T_{72}$—are shown. In this case the generator 14 generates two sets of interlaced pulse trains each set comprising ten trains. The repetition frequency of the pulses in one set of trains hereinafter referred to as the U pulses is arranged to be ten times that of the pulses in the other set of trains hereinafter referred to as the D pulses. The frequencies may be, for example, 5 kc./s. and 500 c./s. respectively. The U pulse in the first train will be referred to as pulses $U_0$, the U pulses in the second train as pulses $U_1$ and so on up to pulses $U_9$. Similarly the ten trains of D pulses will be referred to as pulses $D_0$ to $D_9$ respectively. The pulses $U_0$ to $U_9$ are applied to ten output terminals 74 respectively and the pulses $D_0$ to $D_9$ are applied to ten output terminals 75 respectively. Figure 6 shows two of the D pulses $D_0$ and $D_1$ and three of the U pulses $U_0$ to $U_2$.

The five switch devices 25 to 29 of Figure 1 are replaced, in the embodiment of Figure 5, by two groups 76 and 77 of like switch devices, each group containing ten switch devices. The switch devices may again be as shown in Figures 2 or 3. The D pulses $D_0$ to $D_9$ are applied to the input terminals 30 of the switch devices respectively in the group 76, and the U pulses $U_0$ to $U_9$ are applied to the input terminals 30 of the switch devices respectively in the group 77. The D and U pulses are also combined in the generator 14 in such a manner that there are produced 100 interlaced pulse trains each pulse in each train having the width of a U pulse and occurring simultaneously with one of the U pulses. Any suitable means may be used for this purpose. These pulses will be referred to by the letter P followed by a number, for example $P_{52}$, indicating that this pulse corresponds to the U pulse $U_2$ occurring during the D pulse $D_5$. These 100 pulse trains are applied to 100 terminals respectively of which only three are shown at $P_{03}$, $P_{38}$ and $P_{72}$, these references indicating the P pulses appearing at the terminals respectively. All the pulses $P_{00}$ to $P_{99}$ are combined in a suitable circuit 78 and thence applied to the interrogating circuit 16.

When the contacts 13 are closed by the operation of the relay 12 the first P pulse appearing at the output terminal 35 of the interrogating circuit passes through the lock circuit 34 to the common input terminals 31 of the two groups 76 and 77 of switch devices. The pulses $U_0$ to $U_9$ are applied to the input terminals 30 of the switch devices respectively in the group 77, and the pulses $D_0$ to $D_9$ are applied to the input terminals 30 of the switch devices respectively in the group 76. The P pulse passed by the lock circuit 34 results therefore in only one switch device in the group 77 being operated. For example, assume the P pulse to be $P_{72}$ then the two switch devices to whose input terminals 30 are applied the pulses $D_7$ and $U_2$ respectively are operated. Pulses $D_7$ appear at the output terminal 32 of the group 76 and pulses $U_2$ appear at the output terminal 32 of the group 76. The only $U_2$ pulses required to be passed to the suppressor grid of the valve 36 however, are those which occur during the $D_7$ pulses. In order to achieve this, the D pulses are applied to the suppressor grid of the valve 36 through a rectifier 79 and resistor 80 and the U pulses are applied to the suppressor grid of the valve 36 through a rectifier 81. $D_7$ pulses occurring in the absence of $U_2$ pulses are substantially short-circuited by the rectifier 81. When a $U_2$ pulse occurs, however, this holds the rectifier 81 insulating, whereby a pulse is transmitted to the suppressor grid of the pentode 36, this pulse occurring at the same time as the $U_2$ pulse and having a duration equal thereto. Cancellation of the pulses $P_{72}$ in the output of the interrogating circuit is initially achieved as previously described with reference to Figure 1. 100 gates are also connected between the output of the amplifier 38 and the terminals terminating the 100 channels respectively. These gates function in like manner to the gates 40 to 44 in Figure 1 and three are shown at $G_8$, $G_{38}$ and $G_{72}$ connected to the terminals $T_8$, $T_{38}$ and $T_{72}$ respectively, through low pass filters $F_8$, $F_{38}$ and $F_{72}$.

The unit 10 also contains a mechanical switch shown within a broken line 83, this switch having ten banks each of ten contacts the ten banks being shown conventionally by the ten parallel lines 84. The terminal $T_8$ is connected to the eighth contact in the first bank, the terminal $T_{38}$ to the eighth contact in the fourth bank and so on. This switch has a movable contact 85 capable of being moved to any one of the 100 contacts on the switch 84 by being moved firstly to the end of the appropriate bank and then inwardly to the appropriate contact. When the relay 12 is operated closing the contacts 13, and the groups 76 and 77 of switch devices have been set by the pulse passed by the lock circuit 34, a solenoid 86 is energised and causes the arm 85 to move across the end of the banks 84 of contacts. An auxiliary moving contact 87 is carried at the same time over ten auxiliary fixed contacts 88. These ten auxiliary fixed contacts are connected to the ten switch devices respectively in the group 76 and it is arranged, in any suitable manner, that when a switch device is fired a bias is applied to the auxiliary fixed contact 88 to which it is connected. When the auxiliary moving contact reaches the auxiliary fixed contact which is biased it is arranged in any suitable manner to arrest the movement of the contact 85 of the ends of the banks 84, and to set this contact moving over the ten contacts in the bank. A further ten auxiliary fixed contacts 89 and a further auxiliary moving contact 90 are provided, and it is arranged that whenever a switch device in the group 77 is fired a bias is applied to an appropriate one of the contacts 89. The auxiliary moving contact 90 is carried by the contact 85 when the latter moves over the contacts in one of the banks 84. When the auxiliary contact 89 to which the bias is applied is reached by the contact 90 the movement of the contact 85 is arrested and this contact is therefore connected to the outgoing channel or line whose terminal number is identified with that of the P pulse passed by the locking circuit. The contact 85 is connected to the terminal 11 which is therefore connected on to the identified free outgoing line.

The gates $G_8$, $G_{38}$ and $G_{72}$ also serve in any suitable manner to operate relays $R_8$, $R_{38}$ and $R_{72}$ respectively having contacts $C_8$, $C_{38}$ and $C_{72}$ respectively. The contacts $C_8$, $C_{38}$ and $C_{72}$ connect terminals $P_{08}$, $P_{38}$ and $P_{72}$ respectively to a phase inverter and combining circuit 82 whose output is applied to the interrogating circuit and hence effects cancellation of the pulses $P_{08}$, $P_{38}$ and $P_{72}$ in the interrogating circuit. The electronic part of the incoming unit 10 may then be switched off if desired whilst maintaining cancellation of P pulses identified with engaged channels. In this way an electronic by-pass is provided around the mechanical switch until the mechanical switch is adjusted to its correct setting. This by-pass may conveniently be used for transmitting switching pulses to the distant station.

Where it is required to connect an incoming call in a trunk switching centre to one of a number, say ten, of outgoing junctions, each junction containing say 100 lines, various arrangements may be used such as, for example, ten separate arrangements as shown in Figure 5, one for each out-going junction, the ten arrangements being supplied from a common pulse generator. It may sometimes be preferred, however, to use an arrangement as shown in Figure 7.

Figure 8:
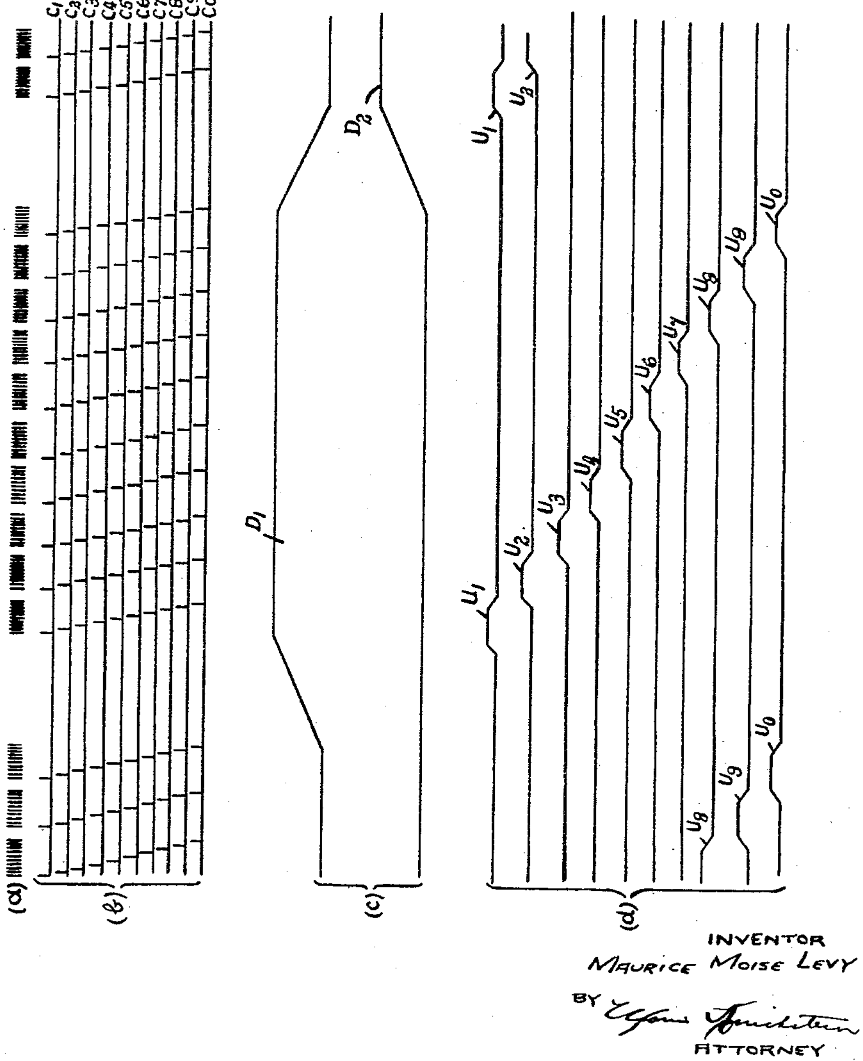
Figure 8 is an explanatory diagram.
Figure 7:
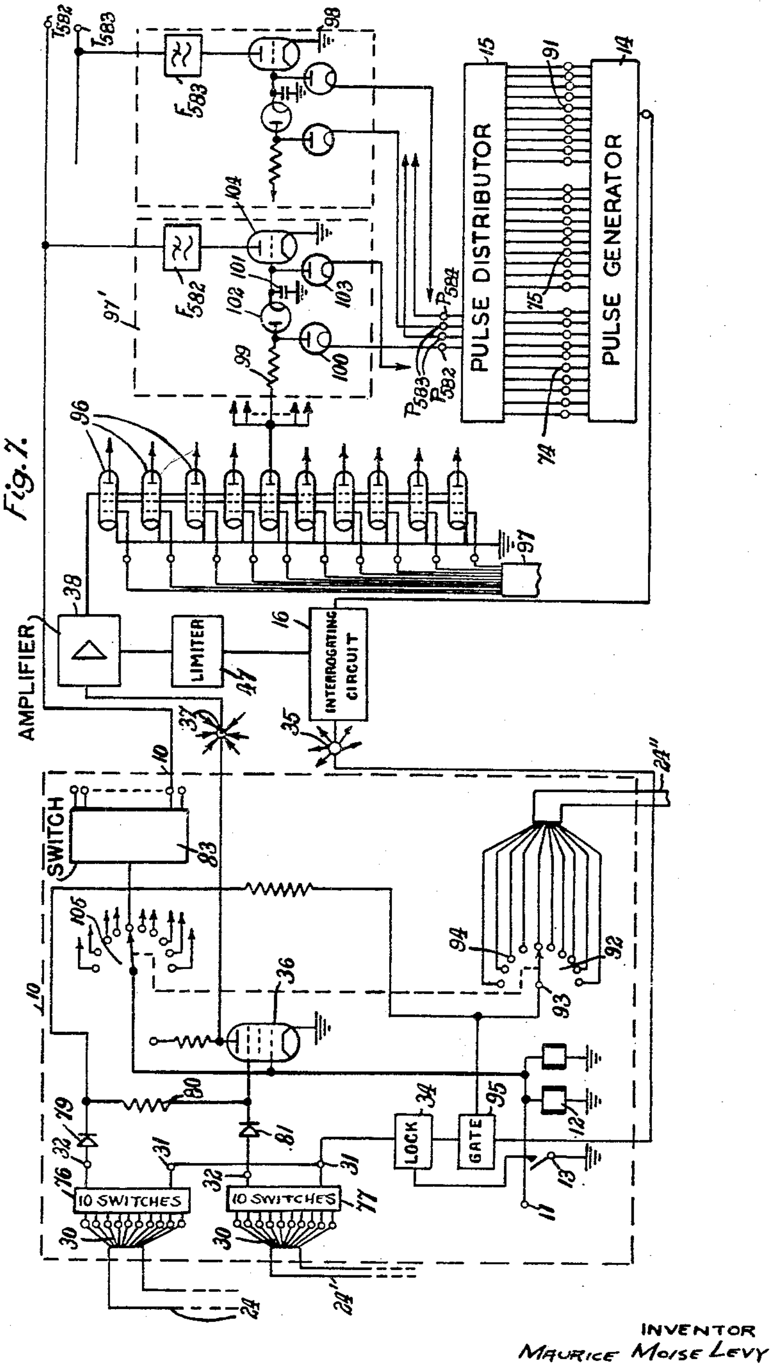
Figure 7 is a schematic diagram of a third telephone exchange embodying apparatus according to the invention.

In Figure 7 the generator 14 generates three groups of pulses which will be referred to as the U pulses, D pulses and C pulses respectively, and are arranged relatively to one another as shown in Figure 8. In Figure 8(*a*) and 8(*b*) each vertical line represents a C pulse. In Figure 8(*c*) a D pulse is shown at $D_1$ and another at $D_2$ and in Figure 8(*d*) ten U pulses are shown at $U_1$ to $U_9$ and $U_0$ respectively. The C pulses are generated in recurring groups each of 1,000 pulses, each group being composed at ten sections, each section containing 100 pulses arranged in ten batches of ten pulses each, the pulses in each batch being equally spaced. Adjacent groups are separated by the width of two D pulses, adjacent batches are separated by the width of two C pulses and adjacent sections by the width of two U pulses. Each U pulse occupies the same interval of time as one of the batches, and each D pulse occupies the same interval of time as ten U pulses and hence one section of the C pulses. The C pulses are distributed by any suitable means to ten output terminals 91 on the generator 14 (Figure 7). The way in which the C pulses are distributed to the ten terminals 91 is shown in Figure 8(*b*). It is arranged that the first pulse in each batch is applied to one of the terminals 91 (Figure 7), these pulses are shown in Figure 8(*b*) as pulses $C_1$. The second pulse in each batch is applied to a second of the terminals 91, these pulses are shown as pulses $C_2$. Similarly the third to the tenth pulses in each batch are applied to the remaining eight of the terminals 91 respectively and are shown in Figure 8(*b*) as pulses $C_3$ to $C_9$ and $C_0$ respectively. For every group of 1,000 C pulses there are, therefore, 100 $C_1$ pulses, 100 $C_2$ pulses and so on. For each D and U pulse combination there is only one $C_1$ pulse, one $C_2$ pulse and so on. In order to identify one pulse in the 1,000 of each group of C pulses it is necessary therefore merely to select the appropriate one of the pulses $D_1$ to $D_9$ and $D_0$, the appropriate one of the pulses $U_1$ to $U_9$ and $U_0$ and the appropriate one of the series $C_1$ to $C_9$ and $C_0$. One suitable arrangement of so doing will now be described with reference to Figure 7.

On the contacts 13 being closed and dialling pulses applied to the terminal 11 to determine the out-going junction to be selected a known switch device is operated and its moving contact 93 moves to one of ten fixed contacts 94 to which the series of pulses $C_1$ to $C_9$ and $C_0$ are applied respectively by way of a cable 24″. The pulses $C_1$ to $C_9$ and $C_0$ are identified with the ten outgoing junctions. At the moving contact 93 there appear only those C pulses which are identified with the selected junction. These pulses are applied to a gate 95 connected between the interrogating circuit 16 and the lock circuit 34.

All the C pulses are applied to the interrogating circuit but because of the gate 95 the only C pulses allowed to reach the lock circuit 34 are those identified with the selected junction. The D pulses are applied to the input terminals 30 of the switch devices respectively in the group 76 by way of cable 24, and the U pulses are applied to the input terminals 30 of the switch devices respectively in the group 77 by way of cable 24′. When a C pulse passes the lock circuit 34 the only two switch devices in the groups 76 and 77 to be fired are those to whose input terminals 30 are applied the D and U pulses respectively occurring at the same time as the C pulse passed by the lock circuit 34. The moving contact 93 of the switch 92 is also connected to the junction of the rectifier 79 and resistor 80 and hence the only pulses in the series selected by the contact 93 to pass to the junction of the resistor 80 and rectifier 81 at substantial amplitude are those which occur during the D pulses passed by the fired switch device in the group 76, which render the rectifier device 79 insulating. Similarly the only pulses reaching the suppressor grid of the pentode 36 are those occurring during the U pulses passed by the fired switch device in the group 77. Of each group of 1,000 C pulses only one, therethrough, reaches the terminal 37. Cancellation is effected in the interrogating circuit as previously described.

The C pulses appearing at the output of the amplifier 38 are also applied to the suppressor grids of ten pentodes 96 to whose grids are applied the series of C pulses $C_1$ to $C_9$ and $C_0$ respectively through a ten-core cable shown in part at 97. The anode of each of the valves 96 is connected to a demodulator and gate device of which two are shown within broken lines 97′ and 98 and will be described later.

The D, U and C pulses are applied to the distributor 15 which has, in this example, 2,000 output terminals arranged in 1,000 pairs. The C pulses in each group of 1,000 pulses are applied to the 1,000 pairs respectively, the polarities of the pulses applied to each pair of output terminals being of opposite sign. Four output terminals are shown, namely, one pair $P_{583}$, one from the pair $P_{582}$ and one from the pair $P_{584}$.

The demodulator and gate arrangement 97' comprises a series resistor 99, a shunt diode 100 whose cathode is connected to the terminal $P_{582}$. It is arranged that the pulses at this terminal are positive-going and serve to gate the diode 100. It is only when these pulses are applied to the cathode of the diode 100 that the positive-going pulses from its associated one of the valves 96 are allowed to pass. These pulses charge a capacitor 101 through a diode 102. The capacitor 101 holds this charge for the duration of 1,000 pulses when a negative-going pulse from the terminal $P_{581}$ (not shown) applied to the cathode of a diode 103 causes the capacitor 101 to be discharged. The capacitor is then recharged by the next succeeding pulse corresponding to $P_{582}$ appearing at the anode of the diode 100. The output of the triode 104 between whose grid and cathode the capacitor 101 is connected contains broad pulses in channel 582. These broad pulses are applied through a filter $F_{582}$ to the terminal $T_{582}$. The modulating voltage applied at the terminal 11 is, therefore, reproduced at the terminal $T_{582}$.

A mechanical connection may also be made from the terminal 11 to the terminal $T_{582}$ by providing ten units 83 as described with reference to Figure 5, one for each outgoing junction. The moving contacts of the units 83 are connected to the ten fixed contacts respectively of a switch device 105 whose moving contact is connected to the input terminal 11 and ganged to the contact 93 of the switch 92.

It will be appreciated that the number of outgoing junctions in a switching centre may be smaller or greater than ten and the number of lines in each junction will usually not be the same but suitable modifications to the arrangements described to meet the various requirements that may arise will be apparent to those skilled in the art.

Although the arrangement of Figure 7 is such that each incoming unit is capable of hunting over all lines in each junction, it may be arranged in any suitable manner that each unit hunts over only a fraction of the lines in each junction. This may be achieved by grading the pulses applied to each incoming unit, for example, by connecting a gate between the terminal 35 and the unit and opening the gate to admit a predetermined number of pulses through. On the other hand the C pulses applied to the switch 92 may be suitably graded.

Furthermore it will usually be necessary to amplify the output pulses from the valves 96 in order to facilitate demodulation. It may also be preferred to broaden these pulses. In this case pulses $C_1$, $C_2$ and $C_3$ may be broadened by lengthening to the instant when the next succeeding $C_0$ pulse occurs, and the $C_4$ to $C_9$ and $C_0$ pulses may be delayed until the instant of commencement of the next $C_1$ pulse and then lengthened to the instant of occurrence of the next succeeding $C_0$ pulse. The distributor 15 may then be arranged to apply U pulses in a suitable sequence to the demodulators, instead of C pulses as previously described.

Figure 9:
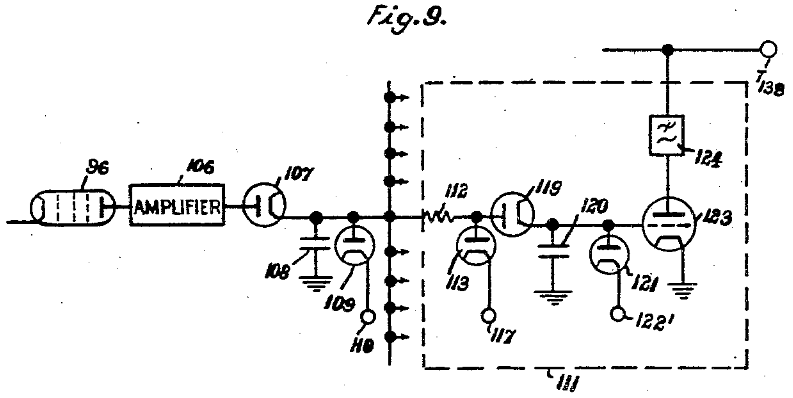
Figures 9, 10 and 11 are circuit diagrams of modifications of parts of Figure 7.

For example, the output circuit of the three valves 96 which pass pulses $C_1$, $C_2$ and $C_3$ may be as shown in Figure 9. It is assumed that the valve 96 in Figure 9 passes the pulses $C_1$. The anode of the valve 96 is connected to an amplifier 106 whose output is assumed to be positive-going and is applied to the anode of a diode 107. The diode 107 passes all the pulses applied to its anode and causes a capacitor 108 to become charged by each $C_1$ pulse. The capacitor 108 is shunted by a diode 109 arranged to be normally non-conducting by suitable biasing means not shown. Negative-going $C_0$ pulses are, however, applied to the terminal 110 connected to the cathode of the diode 109 and serve to render the diode 109 conducting to discharge the capacitor. In this way each $C_1$ pulse is broadened until the instant of occurrence of the next succeeding $C_0$ pulse.

It then remains to apply the lengthened $C_1$ pulses to 100 demodulators each of which serve to select one $C_1$ pulse per 100 $C_1$ pulses to broaden the selected $C_1$ pulse still further to demodulate this broadened $C_1$ pulse and to apply the demodulated intelligence to the appropriate one of the channel terminals. It will be assumed that the three digits of each channel number identify the C, D and U pulses respectively. For example, channel $T_{068}$ indicates $C_0$ pulses coincident with $D_6$ and $U_8$ pulses, $T_{138}$ indicates $C_1$ pulses coincident with $D_3$ and $U_8$ pulses and so on.

In Figure 9 one demodulator is shown within a broken line 111 and it will be assumed that the output of this demodulator is connected to channel terminal $T_{138}$ as shown. The $C_1$ pulses to be selected and dealt with by this modulator are, therefore, those which are coincident with the $D_3$ and $U_8$ pulses. All the broadened $C_1$ pulses appearing at the cathode of the diode 107 are applied through a resistor 112 to the anode of a diode 133 which is arranged to be normally conducting except on the application of a positive-going voltage to its cathode.

Figure 10:
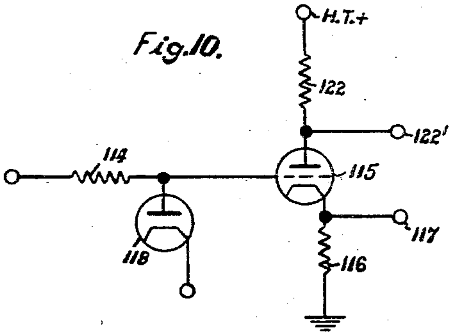

Referring to Figure 10 this shows an arrangement suitable for use in providing gating pulses at the cathode of the diode 113 in Figure 9. In Figure 10 positive-going $D_3$ pulses are applied through a resistor 114 to the control grid of a triode valve 115 having a cathode load resistor 116 and an output terminal 117 connected to its cathode. A diode 118 has its anode connected to the control grid of the triode 115 and is arranged to be conducting except when a positive-going pulse is applied to its cathode. Positive-going $U_8$ pulses are applied to the cathode of the diode 118 and hence those parts of the $D_3$ pulses coincident with $U_8$ pulses reach the control grid of the triode 115.

The terminal 117 is connected to the cathode of the diode 109 in Figure 9. This diode becomes non-conducting, therefore, for the duration of the $U_8$ pulse occurring during each $D_3$ pulse. The broadened $C_1$ pulse occurring during this interval is passed, therefore, to the anode of a diode 119 and charges a capacitor 120.

The capacitor 120 is shunted by a diode 121 arranged to be non-conducting except when a negative-going pulse is applied to its cathode. It is arranged that a negative-going $U_7$ pulse is applied to the cathode of the diode during each $D_3$ pulse. In this way the capacitor 120 remains charged for almost the whole of the interval between successive $C_1$ pulses in channel 138. A circuit as shown in Figure 10 may be used to provide the negative-going $U_7$ pulse at the cathode of the diode 121. The anode circuit of the triode 115 contains a resistor 122 and it is arranged that $D_3$ pulses are applied through the resistor 114 to the anode of the diode 118 and that $U_7$ pulses are applied to the cathode of the diode 118.

The anode of the valve 115 is connected through a terminal 122' to the cathode of the diode 121. The voltage appearing across the capacitor 120 is applied between the control grid and cathode of a triode valve 123 whose anode is connected through a low-pass filter 124 to the channel terminal $T_{138}$.

It will be understood that when pulses $D_3$ and $U_7$ are applied to the arrangement of Figure 10, the terminal 117 connected to the cathode of the triode 115 may be connected to the cathode of the diode 113 in the demodulator dealing with $C_1$ pulses in channel 137.

Figure 11:
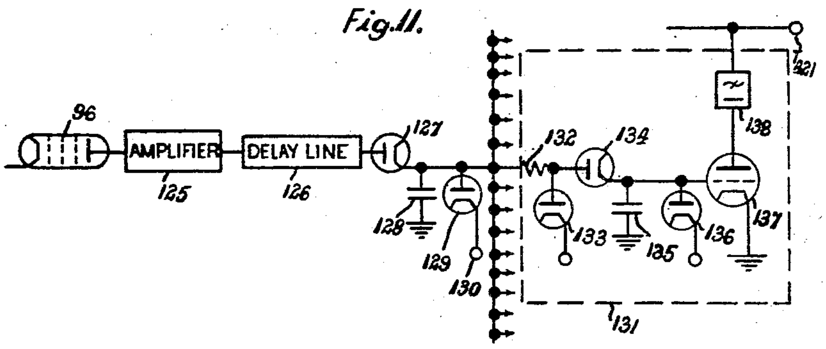

Referring to Figure 11, this shows an arrangement for use in the anode circuit of one of the valves 96 which pass C pulses $C_4$ to $C_9$ and $C_0$ respectively. The anode of the valve 96 is connected through an amplifier 125 to a delay line 126 which serves to delay each pulse passed by the valve 96 until the instant of occurrence of the next succeeding $C_0$ pulse. The narrow C pulses appearing at the output of the delay line 126 pass through a diode 127 and charge a capacitor 128. This capacitor is shunted by a diode 129 arranged to be non-conducting until the instant of occurrence of the next succeeding $C_0$ pulse. Negative-going $C_0$ pulses are applied to the cathode of the diode 129 and discharge the capacitor 128 through a terminal 130. In this way each C pulse appearing at the output of the delay line 126 is lengthened until the instant of occurrence of the next succeeding $C_0$ pulse.

It will be assumed that the valve 96 of Figure 11 passes $C_4$ pulses. It then remains to apply the lengthened $C_4$ pulses to 100 demodulators each of which serves to select one $C_4$ pulse per 100 $C_4$ pulses, to broaden the selected $C_4$ pulse still further, to demodulate this broadened $C_4$ pulse and to apply the demodulated intelligence to the appropriate one of the channel terminals.

In Figure 11 one demodulator is shown within a broken line 131 and has its output connected to channel terminal $T_{421}$. The cathode of the diode 127 is connected through a resistor 132 to the anode of a diode 133 which is arranged to be conducting except when a positive-going pulse is applied thereto. It is arranged that a positive-going $U_2$ pulse is applied to the cathode of the diode 133 during each $D_2$ pulse. The reason for using a $U_2$ pulse for channel 421 will be apparent when it is remembered that each $C_4$ pulse is delayed until the instant of occurrence of the next $C_1$ pulse and then lengthened until the instant of occurrence of the next succeeding $C_0$ pulse. The only pulses to pass the anode of the diode 133 are therefore the broadened $C_4$ pulses in channel 421.

These pass through a diode 134 and charge a capacitor 135. This capacitor is shunted by a diode 136 arranged to be non-conducting except when a negative-going pulse is applied to its cathode. It is arranged to apply the $U_1$ pulse occurring during each $D_2$ pulse to the cathode of the diode 136 to discharge the capacitor 135 and hence the $C_4$ pulses passed by the diode 134 have their durations lengthened to be equal to almost the whole of the interval between successive C pulses in channel 421. The broad pulses appearing across the capacitor 135 are applied through a triode valve 137 to a low-pass filter 138 which demodulates the pulses and applies the demodulated intelligence to the channel terminal $T_{421}$.

The arrangements for applying the appropriate pulses to the cathode of the diodes 133 and 136 may be as shown in Figure 10.

Figure 12:
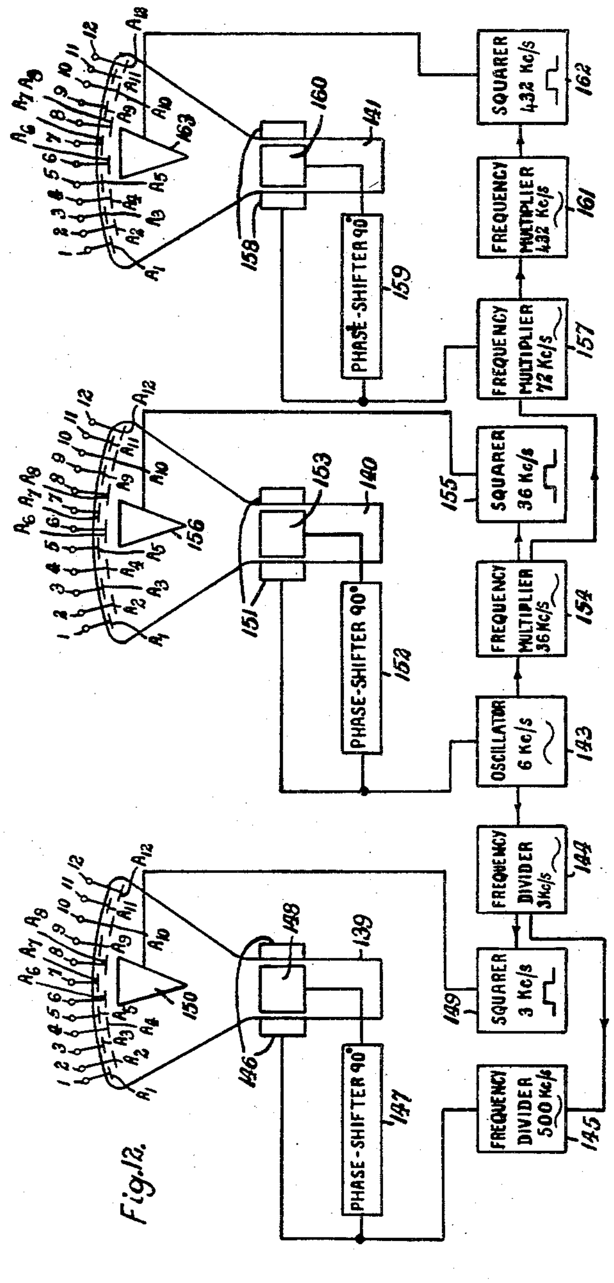
Figures 12 and 13 are schematic diagrams showing a pulse generator and distributor.
Figure 13:
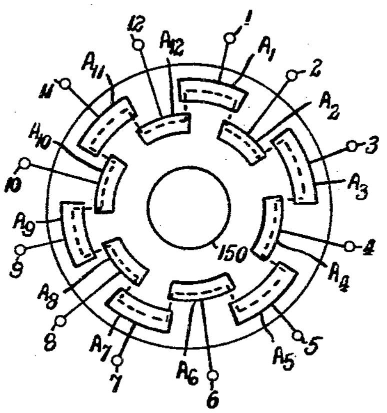

The C, D and U pulses may be generated and distributed by an arrangement as shown in Figure 12 which comprises three cathode ray tube distributors 139, 140 and 141. Each tube has twelve anodes $A_1$ to $A_{12}$ distributed around the face thereof in the manner shown in Figure 13 from which it will be seen that each anode overlaps two others in the radial direction. The electron beam is made to follow the path indicated by the broken line 142 in Figure 13. In the tube 139 the beam is caused to make 500 revolutions per second, in the tube 140, 6,000 revolutions per second, and in the tube 141 72,000 revolutions per second.

Rotation of the beams in the three distributors is produced in any suitable manner. In the present example a master oscillator 143 is tuned to 6 kc./s. One output from the master oscillator 143 is passed through a frequency divider 144 of any known or suitable type to a second frequency divider 145. The divider 144 provides a division ratio of 2:1 and the divider 145 a division ratio of 6:1 whereby the frequencies at the outputs of the two dividers respectively are 3 kc./s. and 500 C./s.

The output of the divider 145 is applied directly to the X deflection coils 146 of the tube 139, and is applied through a phase-shifting network 147 to the Y deflection coils 148 of the tube 139, the phase-shifting network 147 being arranged to produce a phase-shift of 90°.

The output of the frequency divider 144 at 3 kc./s. is also applied to a squarer 149 which is of any known or suitable type and serves to provide an oscillation of square wave form at 3 kc./s. This oscillation is applied to a central electrode 150 of the tube 139, this electrode being of conical shape as shown. The oscillation of square wave form applied to the electrode 150 causes radial deflection of the beam and it is arranged in this way that the path followed by the beam and the anodes $A_1$ to $A_{12}$ is as shown by the broken line 142 in Figure 13.

Pulses appear therefore at each of the anodes $A_1$ to $A_{12}$ at a frequency of 500 P. P. S. The pulses appearing at the anodes $A_{11}$ and $A_{12}$ are not used, and those appearing at anodes $A_1$ to $A_{10}$ constitute the aforesaid D pulses, $D_1$ to $D_9$ and $D_0$ respectively.

A second output, at 6 kc./s., is taken from the master oscillator 143 and applied directly to the X deflection coils 151 of the tube 140, and through a phase-shifting network 152 of any known or suitable type to the Y deflection coils 153 of the tube 140. The phase-shifting network 152 is arranged to produce a phase shift of 90°. A third output is taken from the master oscillator 143 and passed through a frequency multiplier 154 of any known or suitable type to a squarer 155. The frequency multiplier 154 provides a multiplication ratio of 1:6 and the oscillation of square wave form at 36 kc./s. appearing at the output of the squarer 155 is applied to the central conical electrode 156 of the tube 140. It is arranged by these means that the beam in the tube 140 follows a path over the anodes $A_1$ to $A_{10}$ therein as shown by the broken line 142 in Figure 13.

Pulses appear therefore at each of the anodes $A_1$ to $A_{12}$ of the tube 140 at a recurrence frequency of 6,000 P. P. S. The pulses appearing at the anodes $A_{11}$ and $A_{12}$ are not used and those appearing at the anodes $A_1$ to $A_{10}$ constitute the aforesaid U pulses $U_1$ to $U_9$ and $U_0$ respectively.

A further output at 36 kc./s. is taken from the frequency multiplier 154 and passed to a frequency multiplier 157 which provides a multiplication ratio of 1:2 and gives an output oscillation at 72 kc./s. This is applied directly to the X deflection coils 158 of the tube 141, and through 90° phase-shifting network 159 to the Y deflection coils 160 of the tube 141. A further output at 72 kc./s. is applied from the frequency multiplier 157 through a further frequency multiplier 161 to a squarer 162. The multiplier 161 provides a multiplication ratio of 1:6 and the oscillation of square wave form at 432 kc./s. appearing at the output of the squarer 162 is applied to the central conical electrode 163 of the tube 141. It is arranged by these means that the beam in the tube 141 follows a path over the anodes $A_1$ to $A_{12}$ therein as shown by the broken line 142 in Figure 13.

Pulses appear therefore at each of the anodes $A_1$ to $A_{12}$ in the tube 141 at a frequency of 72,000 P. P. S. The pulses appearing at the anodes $A_{11}$ and $A_{12}$ are not used and those appearing at the anodes $A_1$ to $A_{10}$ constitute the aforesaid C pulses $C_1$ to $C_9$ and $C_0$ respectively.

Figure 14:
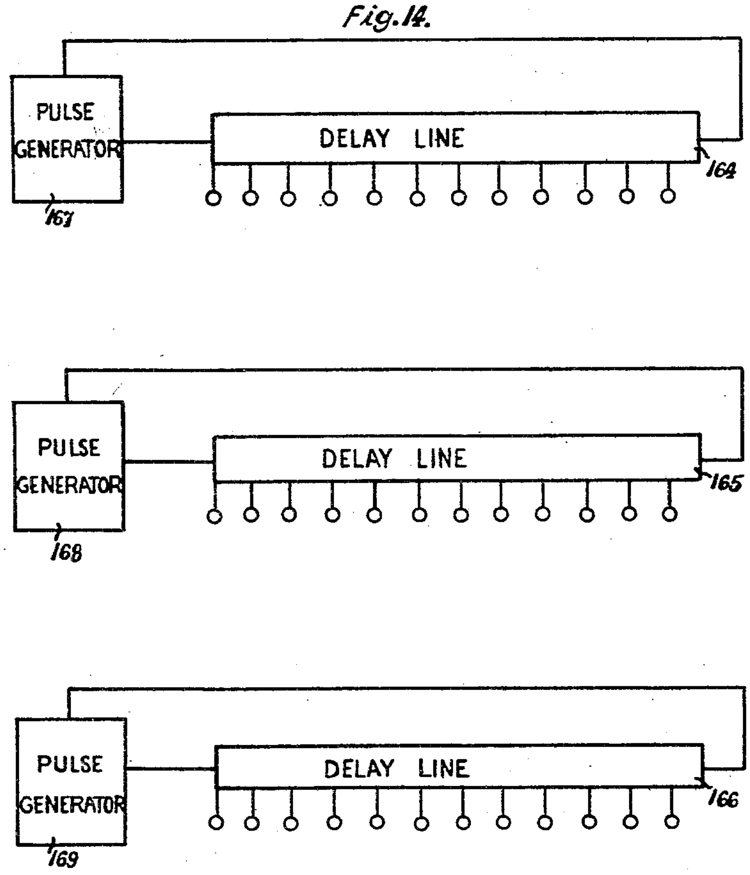
Figure 14 is a schematic diagram of an alternative form of pulse generator and distributor.

Although an arrangement has been described involving the use of rotating beam cathode ray tube distributors for generating the pulses other suitable arrangements may of course be used. For example, Figure 14 shows a suitable arrangement using delay lines 164, 165 and 166, and pulse generators 167, 168 and 169. The pulse generator 167 is arranged to generate regularly recurring pulses say the $D_1$ pulses. These are applied directly to an output terminal shown as a terminal 1 at the input end of the delay line 164. There are twelve output terminals 1 to 12 connected to the delay line 164 as shown at suitable tapping points and it is arranged that the pulses applied to the line 164 from the pulse generator 167 cause pulses to appear at the terminals 1 to 12 corresponding to those appearing at the terminals 1 to 12 of the cathode ray tube distributor 139 to Figure 12.

Similarly it is arranged that the pulse generator 168 generates the $U_1$ pulses and that the pulses appearing at the terminals 1 to 12 of the delay line 165 correspond to those appearing at the terminals 1 to 10 of the cathode ray tube distributor 140 of Figure 12.

It is arranged that the pulse generator 169 generates the $C_0$ pulses and that the pulses appearing at the terminals 1 to 12 of the delay line 166 correspond to those appearing at the terminals 1 to 12 of the cathode ray tube distributor 141 of Figure 12.

Figure 15:
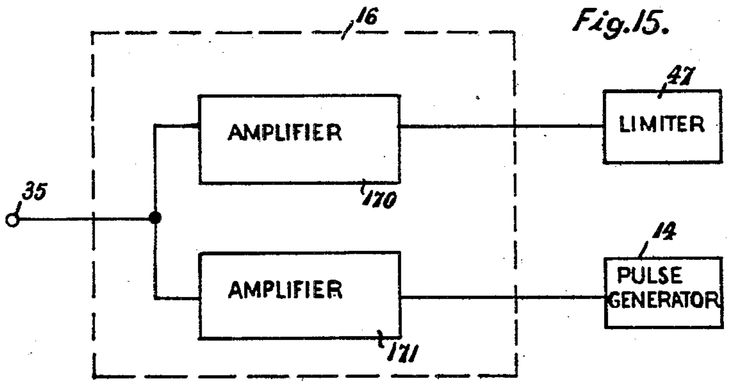
Figures 15 and 16 are schematic diagrams of two alternative arrangements for use as a part shown in block form in Figures 1, 5 and 7.

The interrogating circuit 16 of Figure 1 may be as shown in Figure 15 in which the output of the limiter 47 is applied to an amplifier 170, and the pulses from the pulse generator 14 are applied to an amplifier 171. It is arranged that the pulses appearing at the outputs of the two amplifiers are equal and opposite. The outputs of the two amplifiers are connected in parallel to the terminal 35.

Figue 16 shows a further example of the interrogating circuit 16 of Figure 1. In this example the pulses from the pulse generator 14 are applied to the control grid of a pentode valve 172 which is suitably biased by a bias source 173 to be non-conducting in the absence of pulses on the control grid which are arranged to be positive-going. The output of the limiter 47 is arranged to be negative-going and of an amplitude sufficient to render the pentode 172 non-conducting in the presence of a pulse from the generator 14. The output of the valve 172 is passed through a phase inverting-valve 174 to the terminal 35.

Figure 16:
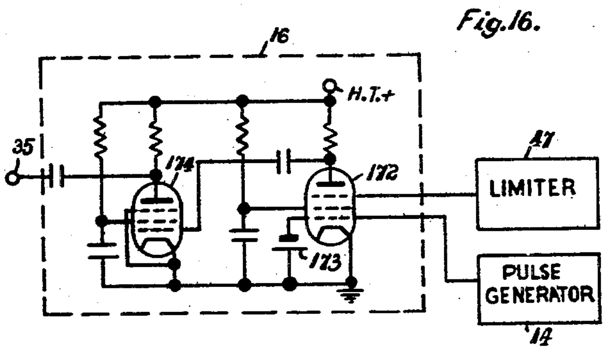

The interrogating circuits of Figures 15 and 16 may, of course, be used in Figures 5 and 7 as well as in Figure 1.

Where there are a large number of channels, say 100 or more, the repetition frequency of the pulses used to identify the channels will usually be too low to enable speech to be satisfactorily transmitted by modulating the pulses therewith. Switches, such as the switch 83 in Figures 5 and 7 are used, therefore, in making the speech connection. It can be arranged, however, that once the incoming unit is operated pulses of a recurrence frequency sufficiently high to carry speech are applied to the suppressor grid of the valve 36. These pulses are arranged in interlaced trains identified with the several channels respectively, it being arranged that pulses in the channel identified by the incoming unit are applied to the suppressor grid of the valve 36.

Figure 17 is a block diagram of part of a further telephone exchange including an embodiment of the present invention. In the arrangement of Figure 17 provision is made for establishing a connection with a free line in any one of ten junctions, each junction having 100 lines. Only 100 pulses are used, instead of the 1,000 C pulses as described with reference to Figure 7, to identify the 1,000 lines, and the speech connections are effected by means as described in the last preceding paragraph. The manner in which speech on the return lines can be dealt with is also shown.

The incoming unit 10 in Figure 17 contains a uni-selector 175 having three banks of fixed contacts 176, 177 and 178 each bank having ten contacts, one contact for each junction of 100 channels. In making a call the moving contacts 179, 180 and 181 of the uni-selector are set in known manner by means of dialling impulses to the fixed contact connected to the junction required. Each junction has a pulse amplifier 182 common to the channels of that junction, an interrogating circuit 16 for use with that junction and a second pulse amplifier 183 common to the channels of that junction. There are therefore in the present arrangement of ten junctions ten amplifiers 182, ten interrogating circuits 16 and ten amplifiers 183. Two pulse generators 14 and 14′ are provided and are common to all junctions. The Go and Return lines of the 100 channels in the ten junctions are terminated by 1000 terminating units respectively. In the drawing the terminating unit for channel 623, that is the 23rd channel of the sixth junction is shown. The terminating units for each junction are connected to the amplifiers 182 and 183 and the interrogating circuit 16 for that junction as shown.

The pulse generators 14 and 14′ are each arranged to generate ten trains of D pulses and ten trains of U pulses, the pulses generated by the generator 14 being of relatively low frequency and for identifying the channels of each junction, and the pulses generated by the generator 14′ being of relatively high frequency and for carrying speech. For example the recurrence frequency of each train of D pulses generated by the generator 14 may be 50 P. P. S. and that of each train of D pulses generated by the generator 14 may be 50 P. P. S. and that of each train of D pulses generated by the generator 14′ may be 8,000 P. P. S.

The ten trains of D pulses appearing at the ten output terminals 75 respectively of the generator 14 are applied by way of the cable 22′, a junction box (not shown) and the cable 24′ to the ten input terminals 30 respectively of the group 76 of ten switch devices in the incoming unit 10. The ten trains of U pulses appearing at the ten output terminals 74 of the generator 14 are applied by way of the cable 22, a further junction box (not shown) and the cable 24 to the ten input terminals 30 respectively of the ten switch devices in the group 77 in the incoming unit 10.

The incoming unit operates in the manner already described to render one switch device in the group 76 and one in the group 77 operative in response to the first pulse appearing at the terminal 35 indicating a free channel in the selected junction. It is arranged that pulses of 8,000 p. p. s. derived from the output of the generator 14′ and in the channel identified by the incoming unit are applied to the suppressor grid of the valve 36 and are modulated by the voltages applied from the input terminal 11 to the control grid of the valve 36.

In order to achieve this, each of the switch devices in the groups 76 and 77 may be as shown in Figure 18. In this figure the input terminal 30 is connected to the control grid of the gas-filled triode 49, and the input terminal 31 is connected to the cathode of the diode 57 whose anode is connected to the control grid of the valve 49. This simple arrangement can be used in view of the fact that the low frequency pulses used for channel identification can be made substantially broader than 20 micro-seconds. The pulses applied to the terminals 30 and 31 are arranged to be positive-going and it will be appreciated that when a pulse appears at the terminal 30 in the absence of a pulse at the terminal 31 the diode 57 provides substantially a short-circuit and the valve 49 does not strike. When, however, a pulse appears at the terminal 31 from the lock circuit it renders the diode 57 non-conducting and allows the valve 49 to be struck by a pulse occurring simultaneously at the terminal 30.

Referring again to Figure 17, the ten trains of high frequency D pulses appearing at the ten output terminals 75′ respectively of the generator 14′, are applied by way of a ten core cable 22′, a junction box (not shown) and a further ten core cable 24′ to ten input terminals 30′ of the group 76 of ten switch devices respectively. Similarly the ten trains of U pulses appearing at the ten output terminals 74′ of the generator 14′ are applied by way of a ten-core cable 22, a junction box (not shown) and a ten-core cable 24, to ten input terminals 30′ of the group 77 of ten switch devices respectively.

The terminal 30′ is shown in Figure 18 to be connected through a capacitor 185 to the anode of the valve 49 and hence, when this valve is struck, the pulses applied to the terminal 30′ appear at the output terminal 32.

It is arranged that correspondingly numbered high frequency and low frequency pulses are applied to the input terminals 30′ and 30 respectively of each unit. For example if the $D_6$ high frequency pulses are applied to the terminal 30′, $D_6$ low-frequency pulses are applied to the terminal 30. The high frequency D and U pulses appearing at the output terminals 31 of the two groups 76 and 77 of switch devices are combined as previously described by means of the rectifiers 79 and 81 and the resistor 80 to provide the high frequency pulses in the identified channel at the suppressor grid of the valve 36.

These high frequency pulses are applied, by way of the moving contact 179 and fixed contact No. 6 of the bank 176 of the uni-selector 175, to the pulse amplifier 182 common to junction No. 6. The output of this amplifier is connected to the 100 terminating units of that junction.

Each terminating unit comprises a selector and demodulator 186 as shown in the drawing, which serves to select the pulses appearing in the channel number of that terminating unit only, to demodulate the pulses and apply the demodulated intelligence to the outgoing or Go line in that channel. The selector and demodulators may, for example, be as shown in Figure 19, in which the output of the amplifier 182, of Figure 18, is applied through a resistor 187 to the control grid of a triode valve 188. A diode 189 has its anode connected to the control grid of the triode 188 and provides substantially a short circuit to pulses applied to the central grid through the resistor 187 in the absence of a positive-going pulse on the cathode of the diode 189. It is arranged that high frequency pulses in the channel number of the terminating unit are applied to the cathode of the diode 189 and hence pulses in this channel reach the anode of the valve 188. These are passed through a low-pass filter 190 to the terminal $T_{623}$ Go.

The pulses applied to the cathode of the diode 189 may be derived as shown in Figure 17 by means of a diode 191 and resistor 192. The D and U high frequency pulses appropriate to the channel are applied to the terminals 193 and 194. For example the pulses for the terminating unit No. 623 shown are $D_2$ and $U_3$ respectively and are arranged to be positive-going.

The terminating unit also contains a pulse gate arranged to open as soon as pulses are passed to the terminal $T_{623}$ Go. The low frequency D and U pulses appropriate to the channel number of the terminating unit, that is to say $D_2$ and $U_3$ in this example, are applied to terminals 196 and 197 respectively and are arranged to be positive-going. The terminal 196 is connected through a resistor 198 to the input of the gate 195 and the terminal 197 is connected to the cathode of a diode 199 whose anode is connected to the input of the gate 195. It follows, therefore, that the $U_3$ pulses occurring during the $D_2$ pulses are the only ones to pass into the gate.

The gate may be arranged as shown in Figure 20 in which a gas-filled triode 200 has its control grid supplied with striking voltage from a rectifier 201 adapted to rectify voltage appearing at the terminal $T_{623}$ Go. The pulses appearing at the anode of the diode 199 are applied through a capacitor 202 to the anode of the valve 200 and as the cathode lead of this valve contains a load resistor 203, the pulses applied to the anode of the valve 200 appear at the cathode thereof and are applied thence to the interrogating circuit 16.

The Return line of the channel associated with the terminating unit is connected to a modulator 204 as shown. High frequency pulses in the channel associated with the terminating unit (channel No. 23 in this example) are applied to the modulator and are modulated by the speech transmitted to the terminating unit over the Return line. These pulses may conveniently be obtained from the anode of the diode 191, and the modulator may be as shown in Figure 21. It will be seen in Figure 21 that the speech received from the Return line is applied to the control grid of a pentode valve 205 and the high frequency pulses in channel No. 23 are applied to the suppressor grid of the pentode 205. The amplitude-modulated pulses appearing at the anode of the pentode 205 are applied to the common pulse amplifier 183 for junction No. 6.

The output of the common pulse amplifier 183 is applied to fixed contact No. 6 of the bank 178 of the uni-selector 175 and thence by way of the moving contact 181 to the control grid of a pentode valve 206. The suppressor grid of the pentode 206 is connected to the suppressor grid of the pentode 36 and hence gating pulses in channel 23 are applied to the suppressor grid of the pentode 206 and the pulses of this channel, and no other, modulated by the return speech appear at the anode of the valve 206. Demodulation is effected by means of a low-pass filter 207 connected between the anode of the pentode 206 and the return speech terminal 11' in the incoming unit 10.

It can of course be arranged that the pulses at the output of the amplifier 182 are broadened before being applied to the terminating units. One suitable arrangement for effecting this is shown in Figure 22. The output of the amplifier 182 is fed through ten resistors 208 to 217 to the anodes of ten diodes 218 to 227 respectively. These diodes are arranged to provide substantially short circuits except when positive-going pulses are applied to their cathodes. It is arranged that the high frequency pulses $U_1$ to $U_9$ and $U_0$ are applied to the cathodes of the diodes 218 to 227 respectively in the positive sense. The only high-frequency channel pulses which can pass the diodes are, therefore, those which coincide with the U pulses applied to the cathodes of the diodes. Each diode allows, therefore, pulses in ten channels to pass.

The pulses which coincide with the $U_1$ pulses are passed by the diode 218 through a further diode 228 and charge a capacitor 229. A diode 230 is connected in shunt with the capacitor and is arranged to be non-conducting except when a negative-going pulse is applied to its cathode. Negative-going, high frequency $U_0$ pulses are applied to the cathode of the diode 230 and cause the capacitor 229 to be discharged. Each pulse passed by the diode 218 is broadened therefore until the instant of occurrence of the next succeeding high-frequency $U_0$ pulse. These broad pulses are applied to ten output terminals which are connected to the ten terminating units whose channel numbers end with the digit 1, as shown in the drawing.

The diodes 219 and 220 allow pulses coinciding with the high frequency $U_2$ and $U_3$ pulses respectively to pass. Broadening is effected in the same way as described in the last preceding paragraph, the broadened pulses passed by the diodes 219 being applied to ten output terminals connected to the ten terminating units whose channel numbers end with the digit 2, and those passed by the diode 220 being applied to ten output terminals connected to the ten terminating units whose channel numbers end with the digit 3.

The pulses passed by the diodes 221 to 227 are delayed until the instant of occurrence of the next succeeding $U_1$ pulse and are then broadened until the instant of occurrence of the $U_0$ pulse following the last said $U_1$ pulse. For example, the pulses passed by the diode 221 are applied through a delay line 231 and a diode 232 to charge a capacitor 233, the delay line 231 being arranged to delay the pulses applied thereto until the instant of occurrence of the next succeeding $U_1$ pulse. The capacitor 233 holds the charge until the occurrence of the next $U_0$ pulse which is applied to the cathode of a diode 234 and renders this diode conducting to discharge the capacitor 233. The broadened pulses appearing across the capacitor 233 are applied to ten output terminals which are connected to the ten terminating units whose channel numbers end with the digit 4.

The pulses passed by the diodes 222 to 227 are delayed and broadened in like manner to those passed by the diode 221, and are applied to separate groups each of ten terminals connected respectively to the terminating units whose channel numbers end with the digits corresponding to the subscripts of the U pulses applied to the diodes 222 to 227 respectively as shown.

When broadened pulses are used as just described, the appropriate D pulse is applied to the cathode of the diode 189 of Figure 19 (which shows one example of the selector and demodulator 186 of Figure 17) instead of the appropriate channel pulse as previously described. For example, in order to select pulses in channel 1 which appear across the capacitor 229 in Figure 22, $D_0$ pulses are applied to the cathode of the diode 189 of Figure 19. In selecting pulses passed by the diodes 221 to 227 of Figure 22, it is necessary of course to apply a D pulse to the cathode of the diode 189 of Figure 19 having a subscript next succeeding the first digit of the channel number of the terminating unit. For example, assuming that pulses in channel No. 54 are to be selected then $D_6$ pulses are applied to the cathode of the diode 189.

It will be understood that as pulses of relatively low recurrence frequency can be used in the arrangement of Figure 17 to identify the several channels, the lock circuit need not contain a blocking oscillator as shown in Figure 4, the pulses themselves having sufficient energy for operating the switch devices in the control unit. The lock circuit may then be simplified for example as shown in Figure 23. In this figure the terminal 35 is connected to the anode of the gas-filled triode valve 59 and the relay contacts 13 are connected between the control grid of the valve 59 and earth as in Figure 4.

When the relay contacts 13 are closed the valve 59 strikes and the next pulse appearing at the terminal 35 appears at the cathode of the valve 59 and is transmitted by way of a capacitor 235, resistor 236 and further capacitor 237 to the output terminal 33. The pulse appearing at the cathode of the valve 59 is also passed through a resistor 238 and diode 239 to charge a capacitor 240. The time constant of charge of the capacitor 240 is arranged to be such that the capacitor 240 becomes fully charged just before the end of the pulse appearing at the cathode of the valve 59. The capacitor 240 is connected between the control grid and cathode of a second gas-filled triode valve 241 and when the capacitor 240 is fully charged it is arranged that the voltage across this capacitor is sufficient to cause the valve 241 to strike.

A diode 242 has its anode connected through a resistor 243 to the positive terminal 244 of a source (not shown) of H. T. whose negative terminal is earthed, it being arranged that the terminal 244 is less positive than the H. T. terminal 245 to which the anode of the valve 241 is connected, but is more positive than the anode of the valve 241 when the valve is struck. When the valve 241 strikes substantially a short circuit is provided from the anode of the diode 242 through the diode 242 and the valve 241 to earth. As the valve 241 strikes just before the end of the first pulse appearing at the cathode of the valve 59, this is the only pulse which gets through to the output terminal 33, subsequent pulses being short-circuited to earth.

The contacts 62 serve to extinguish the two valves 59 and 241 at the end of the call as described with reference to Figure 4.

In the arrangements hereinbefore described, with the exception of Figure 1, the pulses have been generated in accordance with the decimal system. Other systems may of course be used. For example, where there are 64 channels to be dealt with, the group of switch devices 76 and 77 may each contain eight switch devices instead of ten as already described. The pulses may then be generated in two groups each of eight trains, the trains in one of the groups being eight times the frequency of those in the other group.

If desired the binary system may of course be used. For example Figure 24 is a circuit diagram of a control circuit suitable for use with 32 channels and adapted for use with pulses generated in accordance with the binary system. In this arrangement there are five groups 276 to 280 of switch devices, each group having two switch devices. The form of the pulses applied to the input terminals 30 of the ten switch devices is as shown in Figure 25 (*a*) to (*e*) the pulses applied to the ten switch terminals 30 being shown alongside these terminals respectively. The voltages applied to the terminals 30 of each group are of the same frequency but in anti-phase, and the frequencies of the pulses applied to the five groups being related as shown, those applied to the group 277 being twice those applied to the group 276, those applied to the group 278 being twice those applied to the group 277 and so on.

The pulse passed by the lock circuit 34 is of a duration equal to any one of the pulses as shown in Figure 25(*e*) and hence only one switch device in each of the groups is made operative thereby. For example, if the pulse passed by the lock circuit occurs at the time shown by the single pulse in Figure 25(*f*) the upper switch device in the group 276, the lower switch devices in the remaining groups are made operative. The pulses $B_1$ of Figure 25(*a*) appear at the output terminal 32 of the group 276. These pulses are applied through a resistor 281 to one plate of a rectifier 282 the other plate being connected to the output terminal 32 of the group 277. This rectifier is arranged to provide substantially a short-circuit except when a positive-going pulse appears at the terminal 32 of the group 277. The pulses $B'_2$ of Figure 25(*b*) appear at the terminal 32 of the group 277 and hence only that part of the positive pulse $B_1$ coinciding with the positive pulses $B'_2$ are allowed to pass. This process is repeated for the several groups. The pulse finally appearing at the suppressor grid of the valve 36 is therefore, the $B'_{16}$ pulse which coincides with a $B'_8$, a $B'_4$, a $B'_2$ and a $B_1$ pulse, and is the pulse 284 in Figure 25(*e*).

It will be understood that the switch devices shown in Figure 24 may be as shown in Figure 18 and that high frequency binary pulses for carrying speech may be applied to the input terminals 30′ of the switch devices. The frequencies of these high frequency pulses must be related in the same way as those shown in Figure 25(*a*) to (*e*).

Referring now to Figure 26, this is a block schematic diagram of an automatic telephone exchange as described in the specification of the aforesaid patent application No. 23,341/50. The automatic telephone exchange shown is within a broken line 410 and of the telephones (that is to say telephones with dialling apparatus) connected to the exchange two are shown at 411 and 412.

The telephone 411 is connected to terminal equipment 413 in the exchange and the first operation to take place in the exchange when the call is made is effected by the terminal equipment 413 which causes the wiper of a pre-selector 414 to hunt in known manner over its bank contacts. These contacts are connected to a number of calling units respectively, one calling unit being shown at 15, and the pre-selector serves to connect the terminal equipment 413 to a calling unit not already in use by any other subscriber. One form of calling unit will be described later.

A pulse generator 416 is adapted to generate a number of pulse trains equal to the number of calling units, the pulse trains being interlaced with one another and constituting gating pulses for providing several time-sharing communication channels. The several trains of gating pulses appear at output terminals 417 respectively of which only six are shown, and the several output terminals 417 are connected to the several calling units respectively. The calling unit 415 is shown to be connected to the fourth output terminal and it will be assumed that pulses in channel No. 4 appear at this terminal. The calling unit 415 is, therefore, identified with channel No. 4 and as will be described later is adapted to pass signals in channel No. 4 only.

After the calling unit 415 has been seized by the pre-selector 414 an allotter 418 comes into operation and allots to the terminal equipment 413 a coder 419 and provides a dialling tone which indicates to the calling subscriber that he can commence dialling the telephone number of the subscriber he wants to call. At the same time an automatic selector 420 associated with the coder is brought into operation. The bank contacts of the selector are connected to the several calling units respectively, and when the wiper reaches the fourth bank contact which is connected to the calling unit 415 already seized, and to which the coder is allotted, the wiper is arrested in known manner.

The wiper of a second bank 421 of the selector 420 also comes to rest on its fourth bank contact. The bank contacts 421 are connected to the output terminals respectively of the generator 416, the fourth contact being shown to be connected to the channel No. 4 output terminal.

The coder 419 is any suitable device for storing dialling signals from the calling subscriber, converting the dialling signals into a coded signal which is suitable for application to a routing device 422, and in addition identifies the channel number of the calling unit seized by the line finder 414. A preferred form of coder is described in the specification of co-pending U. S. application Ser. No. 247,073, Chubb, Mawson and Levy, filed September 18, 1951, for Automatic Telephone Exchanges, the owner of which is the assignee of the present application. In the preferred coder 419 the pulses applied thereto from the selector 421 serve to gate the output of the coder whereby the coded signals appear in the channel intervals identified with the seized calling unit (that of channel No. 4) and in no other.

The output from the coder 419, together with the output from any other coders which may be in operation at the same time, is passed to the input of the router 422. The router has several output terminals 424 which are connected to the terminal equipments respectively of the several telephones connected to the exchange, the terminal equipment of the telephone 411 being, as already described, shown at 413 and that of the telephone 412 being shown at 425.

The router, in response to the coded signal from the coder 419 provides at the output terminal 424 connected to the terminal equipment 425 a succession of pulses which occur in successive channel intervals respectively in channel No. 4. The router may take any suitable form but is preferably as described in my co-pending U. S. application Ser. No. 247,233, filed September 9, 1951, for Switching Devices.

If the telephone 412 is not engaged the terminal equipment 425 passes the first received pulse to the called subscriber's pre-selector which then operates in known manner to drive its wiper over its bank contacts. A number of called units equal to the number of calling units are connected to the bank contacts respectively of this pre-selector and the wiper of the line finder is arrested in known manner on a contact to which is connected a called unit 427 not already in use. One form of the called unit will be described later.

An allotter 428 then comes into operation and allots a decoder 429 to the seized called unit 427. The decoder serves to read the channel number (No. 4 in this example) of one of the next received pulses of the succession above mentioned (by its time of occurrence) and apply to the called unit 427, through a second bank of contacts 430, gating pulses in channel No. 4.

The several outputs from the generator 416 are connected to the several input terminals 431 of the decoder and the decoder serves to apply the pulses of the identified channel through the switch 430 to the called unit 427.

The called unit then becomes identified with channel No. 4 and is then adapted, as will be described later, to pass signals in channel No. 4 only.

All calling and called units are connected to a "Go," speech, time-sharing junction 432 and a "Return" speech, time sharing junction 433, whereby speech communication can be established between any two calling and called units gated with channel pulses of the same channel. As the calling unit 415 and called unit 427 are both gated by pulses in channel No. 4 communication can be established between the telephones 411 and 412.

It can readily be arranged that the first pulse received by the calling unit 415 from the called unit 427 by way of the "Return" speech, time-sharing junction 33, operates a relay which then causes the allotter, and hence the coder 419 with its selectors 420 and 421 to be released. The coder may then be utilised to deal with a call from a further subscriber. The coder 419 and the router 422 are not then in use for the duration of the conversation but only for establishing the call.

If preferred a separate control time-sharing junction 434 may be used for releasing the coder 419. In this case the pulses (in channel No. 4 in this example) applied to the called unit 427 are also transmitted by way of the time-sharing junction 434 to the calling unit where they may be used as described to release the coder 419.

It can also be arranged that in the event of the called subscriber being engaged (telephone 412 in this example) the terminal equipment 425 routes the first pulse received from the router through a "Busy signal" time-sharing junction 435 back to the coder 419 and operates a relay which then causes an "engaged tone" to be transmitted to the calling subscriber.

Figure 27 shows part of a suitable form of calling unit 415 which comprises two gated pentodes 436 and 437 whose suppressor grids have applied thereto the pulses in channel No. 4 from the generator 416. The anode of the pentode 436 is connected to the time-sharing junction 432, and the control grid of the pentode 437 to the time-sharing junction 433. The calling unit 415 also includes apparatus 438 which serves to apply speech signals from the finder 414 to the control grid of the pentode valve 436, and includes a demodulator for demodulating the pulses appearing at the anode of the pentode 437.

Figure 28 is a theoretical circuit diagram of a suitable called unit 427. The unit comprises two pentodes 439 and 440 whose suppressors are connected together and to the moving contact of the switch 430, and the arrangement is such that pentodes 439 and 440 are non-conducting except when pulses (channel No. 4 in this example) are applied to the suppressors from the switch 430. The control grid of the valve 440 is connected to the time-sharing junction 432 and the anode of the valve 439 is connected to the time-sharing junction 433. The anode of the valve 440 and the control grid of the valve 439 are connected to suitable apparatus 441 which serves to apply speech signals from the terminal equipment 425 to the control grid of the valve 439 and contains a low-pass filter for demodulating the amplitude-modulated pulses appearing at the anode of the valve 440.

A relay 442 having a winding connected to the terminal equipment 425 is also provided. When a pulse is received at the terminal equipment 425 from the router 422 (Figure 26) (assuming the telephone 412 is not engaged) the relay 442 becomes energised and causes a pentode valve 443 to become conducting. The suppressor grid of the valve 443 is connected to those of the valves 439 and 440 and each channel pulse (in channel No. 4 in this example) applied to the unit 437 after the valve 443 becomes conducting is also transmitted through the valve 443 to the time-sharing junction 434. Alternatively the relay 442 and pentode 443 may be replaced by a gas-filled triode adapted to permit the pulses to be transmitted to the junction 434 when struck.

The number of speech communication channels provided is dependent upon the expected peak calling rate and the average duration of conversations. The number of pulse trains provided by the generator 416, and the number of calling and called units, required is, in each case equal to the number of channels. The number of channels may be, for example, 500 where the number of subscribers is 10,000. The number of coders required and the complexity of the router are, however, mainly dependent upon the calling rate and the average time taken from the initiation of a call to the instant when the coder used is released.

The several communication channels may be provided by interlaced pulse trains as described. The speech signals may in this case be conveyed by amplitude-modulation as described but width, or time-modulation of the pulses may be used. The several channels may be provided by several oscillations respectively of different frequencies, which may be amplitude, frequency or phase-modulated by the speech signals. It is also envisaged that the several channels may be provided by several physical lines respectively. In the latter event interlaced pulse trains or oscillations of different frequencies may be used to identify the several channels to the decoders.

The router 422 may, of course, be in the form of automatic switching apparatus as currently used in automatic telephony practice. In this case the coders 419 need not be employed and it can readily be arranged that when a connection is established from the calling unit 415 to the terminal equipment 425 pulses in channel No. 4 are transmitted through the automatic switching apparatus to the terminal equipment 425.

It will be understood that the decoder 429 may be substantially the same as the incoming unit 10 shown in Figure 1, 5, 7 or 17. For example Figure 29 shows the manner in which the incoming unit 10 of Figure 1 may be modified to function as the decoder 429 of Figure 26. It will be seen that the input terminal 11 in addition to being connected to the relay 12 is connected through a capacitor 436 to the terminal 35. The first pulse appearing at the terminal 11 after the contacts 13 are closed passes therefore through the capacitor 436 to the lock circuit which functions in the manner already described, and passes one pulse to the input terminals 31 of the switch devices in the control circuit. The terminals 431 of the decoder are connected to the input terminals 30 of these switch devices respectively and hence only one is operated. The pulses applied to the input terminal of the operated switch device appear at its output terminal 32 and are applied by way of the switch device 430 to the called unit 427.

It will be understood that by arranging the generator 416 to generate D and U pulses or C, D and U pulses as the case may be, an incoming unit as shown in Figure 5, 7 or 17 with suitable modifications may be used.

In the arrangements so far described the channel identifying voltages are pulses characterised by their instants of occurrence. Voltages characterised in other ways may be used. For example Figure 30 is a block schematic diagram of a simple arrangement in which the channel identifying voltages are oscillations of different frequencies.

In the simple arrangement shown in Figure 30 it is assumed that there are five lines terminated at the terminals $T_1$ to $T_5$ respectively as in Figure 1. The generator 14 is arranged to generate five oscillations of different frequencies which appear at the output terminals 17 to 21 respectively. These oscillations are applied to the interrogating circuit 16 and to the input terminals 30 of the five switches 25 to 29 respectively in the incoming unit 10. In the interrogating circuit 16, the five oscillations are applied to the input terminals of five gates 285 to 289 respectively. These gates are arranged to be open when the lines $T_1$ to $T_5$ are not engaged and hence the applied oscillations pass through the gates. The output terminals of the five gates are connected to the five fixed contacts 290 to 294 respectively of a switch device 295. The moving contact 296 of the switch device 295 is arranged to rotate over the fixed contacts 290 to 294 continuously and hence to connect the outputs of the gates 285 to 289 in succession to the output terminal 35 of the interrogating circuit. The voltages appearing at the terminal 35 are therefore bursts of oscillation of different frequencies. The first burst appearing at the terminal 35 after the contacts 13 are closed operates the lock circuit which passes this burst to the input terminals 31 of the five siwtch devices in the control circuit and allows no further oscillation to pass.

Five band-pass filters 296 to 300 are connected between the input terminals 31 and the switch devices 25 to 29 respectively. These band-pass filters are arranged to pass oscillations of the frequencies of the five generated oscillations respectively and no others. The burst passed by the lock circuit is passed, therefore, to only that one of the switch devices 25 to 29 to whose input terminal 30 is applied the oscillation of the same frequency. This switch device is arranged to operate and the oscillation applied to its input terminal 30 appears at its output terminal 32 and is applied thence to the control grid of the pentode valve 36. The terminal 11 is connected to the suppressor grid of the valve 36 and hence signals applied to the terminal 11 amplitude moderate the oscillation applied to the control grid.

The amplitude-modulated oscillations are applied by way of the terminal 37 and amplifier 38 to five band-pass filters 301 to 305 whose outputs are applied to the terminals $T_1$ to $T_5$. Each of these filters is arranged to pass only one of the modulated carriers the five filters passing different ones respectively.

The output of the amplifier 38 is also applied through the limiter 47 to the interrogating circuit 16. In the interrogating circuit the output from the limiter 47 is passed to five bandpass filters 306 to 310, arranged to have the same pass-bands as the filters 301 to 305 respectively. The outputs of the filters 306 to 310 are applied to close the gates 285 to 289 respectively. It will be seen therefore that as soon as an oscillation appears at the terminal 37, the bursts of oscillation of that frequency are cancelled from the output of the interrogating circuit.

The gates 285 to 289 may be as shown in Figure 31 which is a circuit diagram of the gate 285 of Figure 30. The terminal 17 of the generator 14 is connected to the control grid of a pentode valve 311, and the output of the filter 306 is applied to produce a negative bias by means of a rectifier 312, a capacitor 313 and a leak resistor 314. This negative bias is applied to the suppressor grid of the pentode 311 and is arranged to be of sufficient amplitude to cut off the anode current of the pentode 311.

In the absence of output from the filter 306 the oscillation applied to the control grid of the pentode 311 is reproduced at the anode thereof and is applied through a capacitor 315 to the fixed contact 290 of the switch device 295. When however an oscillation appears at the output of the filter 306 the anode current of the pentode 311 is cut-off and the oscillation applied to the control grid is no longer reproduced at the anode.

The lock circuit may conveniently be as shown in Figure 23. The first burst of oscillation appearing at the cathode of the valve 59 of Figure 23 is passed through the capacitor 235, the resistor 236 and the capacitor 237 to the output terminal 33. This burst is also applied however, to the rectifier 239 and positive half cycles passed by the rectifier 239 charge the capacitor 240. It is arranged that towards the end of the burst the voltage across the capacitor 240 is sufficient to cause the valve 241 to strike. This valve then functions with the diode 242 to prevent any further voltage from being transmitted to the output terminal 33 as previously described.

The switch devices 25 to 29 may be as shown in Figure 32, which is a theoretical circuit diagram of the switch device 25. It will be seen that the output of the filter 296 is rectified by a diode rectifier 316 and applied to charge a capacitor 317 provided with a leak resistor 318. When, therefore, a burst of oscillation at a frequency within the pass-band of the filter is applied from the lock circuit to the terminal 30, the capacitor 317 becomes charged with its upper plate positive. It is arranged that the voltage developed across the capacitor 317 is of sufficient magnitude to strike the valve 49. The input terminal 30 is connected through the capacitor 50 to the anode of the valve 49 and hence the oscillation applied to the terminal 30 appears at the output terminal 32 when the valve 49 is struck. It will be seen that in this example the oscillation applied to the terminal 30 plays no part in striking the valve 49, and serves merely as an input terminal for applying to the anode of the valve the oscillation in the same channel as the burst passed by the filter 296. If the valve 49 is required to provide only a direct voltage at the terminal 32 for controlling a mechanical selector switch such as 83 in Figure 5, the terminal 30 and capacitor 50 may, of course, be dispensed with.

I claim:

1. Apparatus for identifying a free channel in a multi-channel communication system and for enabling signals to be transmitted from a signal voltage terminal to an identified free one of the channels in said system, said apparatus comprising a generator to generate a plurality of interlaced pulse trains, means connected between said generator and said channels to identify said pulse trains with the several channels respectively in said system, a second terminal, a pulse cancelling circuit connecting said generator to said second terminal, means connected between said channels and said pulse cancelling circuit to cancel those of said pulse trains identified with engaged ones of said channels, an electrically controllable selector switching device connected between said signal voltage terminal and said channels, a control circuit to control said selector switching device, and means connecting said control circuit between said second terminal and said selector switching device, said control circuit comprising means responsive to a pulse appearing at said second terminal from said pulse cancelling circuit to cause said selector switching device to select the channel identified by the last said pulse for connection to said signal voltage terminal.

2. A multi-channel communication system comprising a signal voltage input terminal, means to identify a free one of the channels in said system, and means automatically to connect said signal voltage input terminal to an identified one of said channels, said identifying means comprising a source of pulses, a pulse selector circuit, a second terminal, means connecting said pulse selector circuit between said source and said second terminal, means connected between said channels and said pulse selector circuit and responsive to free conditions in different ones of said channels to cause said pulse selector to select different ones of said pulses for application to said second terminal, and said automatic connecting means comprising electrically-controllable switching devices connected between said channels respectively and said signal voltage terminal, and a control circuit connected between said second terminal and said switch devices, said control circuit comprising means responsive to a pulse at said second terminal to operate the one of said switch devices which is connected to the one of said channels identified by the last said pulse.

3. A multi-channel communication system comprising *m* channels, a signal voltage terminal, and apparatus for identifying a free one of said channels and establishing a signal transmission link between said signal voltage terminal and said free one of said channels, said apparatus comprising a second terminal, means connected between said channels and said second terminal and responsive to free conditions in said free one of the channels to provide at said second terminal a channel identifying pulse whose instant of occurrence identifies said free one of the channels, a control voltage supply circuit having an input terminal connected to said second terminal, said control voltage supply circuit comprising 2 groups of coincidence switches, a first of said groups comprising $p$ coincidence switches and a second of said groups comprising $m/p$ coincidence switches, where $p$ and $m/p$ are each integers greater than unity and may be equal, each said coincidence switch having a first input terminal, a second input terminal and an output terminal, means to apply said channel identifying pulse to said first input terminal of all said coincidence switches, means for generating 2 groups of pulse trains, the trains of each of said groups of pulse trains being interlaced with one another, a first of said groups of pulse trains comprising $p$ trains each at a recurrence frequency $f$, and a second of said groups of pulse trains comprising $m/p$ trains each of a recurrence frequency of $f/p$, each of the pulses in said first group of trains having a width comparable with that of said channel-identifying pulse, and each pulse in said second group of trains having a width comparable with the time occupied by $p$ successive pulses in said first group of trains, means to apply said first group of trains to said second input terminals of said coincidence switches respectively in said first group of coincidence switches, means to apply said second group of trains to said second input terminals of said coincidence switches respectively in said second group of coincidence switches whereby one coincidence switch in each group is operated in response to said identifying pulse, a source of voltage, means to apply said voltage through said coincidence switches, when operated, to said output terminals thereof, an electrically-controllable switch device connected between said signal voltage terminal and said channels and having a control circuit connected to the output terminals of said coincidence switches to operate said switch device.

4. A multi-channel communication system comprising *m* channels terminated at *m* terminations respectively, a signal voltage input terminal and apparatus to identify a free one of said channels and to establish a signal transmission link between said signal voltage terminal and the termination of an identified free one of said channels, said apparatus comprising a second terminal, means connected between said second terminal and said terminations to provide at said second terminal a different train of channel identifying pulses in response to free conditions in different ones respectively of said channels, said pulse trains being interlaced with one another, a pulse selector circuit connected to said second terminal, said pulse selector circuit comprising means responsive to a first channel identifying pulse applied thereto from said second terminal to lock out further pulses, 2 groups of coincidence switches, a first of said groups comprising $p$ coincidence switches and a second of said groups comprising $m/p$ coincidence switches, where $p$ and $m/p$ are each integers greater than unity and may be equal, each said coincidence switch having a first input terminal, a second input terminal, a third input terminal and an output terminal, said third input terminal of each coincidence switch when operated being connected to said output terminal thereof, means to apply said first pulse to said first input terminal of all said coincidence switches, means for generating 2 groups of pulse trains, the trains of each of said groups of pulse trains being interlaced with one another, a first of said groups of pulse trains comprising $p$ trains each at a recurrence frequency $f$, and a second of said groups of pulse trains comprising $m/p$ trains each of a recurrence frequency of $f/p$, each of the pulses in said first group of trains having a width comparable with that of said channel-identifying pulses, and each pulse in said second group of trains having a width comparable with the time occupied by $p$ successive pulses in said first group of trains, means for applying said first group of trains to said second input terminals of said coincidence switches respectively in said first group of coincidence switches, means for applying said second group of trains to said second input terminals of said coincidence switches respectively in said second group of coincidence switches, means for generating 2 further groups of pulse trains, the trains of each said further group being interlaced with one another, a first of said further groups of trains comprising $p$ trains each at a recurrence frequency $f_1$ higher than $f$, a second of said further groups of trains comprising $m/p$ trains, each at a recurrence frequency of $f_1/p$, each of the pulses in said second of said further groups having a duration comparable with the time occupied by $p$ successive pulses in said first of said further groups, means for applying said first of said further groups of trains to said third input terminals of the coincidence switches respectively in said first group of coincidence switches, means for applying said second of said further groups of trains to said third input terminals of said second group of coincidence switches respectively, whereby when one coincidence switch in each of said first and second groups of coincidence switches are operated in response to said first pulse, one pulse train from each of said first and second further groups of trains appears at the outputs of said first and second groups respectively of coincidence switches, means connected to the output terminals of said switches for combining the last said two trains of pulses to provide carrier pulses, a modulator, means for applying said carrier pulses to said modulator, a connection from said signal voltage terminal to said modulator to apply signal voltage from said signal voltage terminal to modulate said carrier pulses, a circuit to apply said modulated carrier pulses to at least some of said terminations including the termination of the one of said free channels identified by said first pulse, and means in the circuit of said termination of said identified free channel to select said modulated carrier pulses.

5. A multi-channel communication system as claimed in claim 4, wherein each said coincidence switch comprises a gas-filled electron discharge valve having an anode, a cathode, and at least one control electrode, a resistive device, means connecting said resistive device between said first input terminal and said control electrode, a rectifier device, means connecting the cathode of said rectifier device to said second input terminal of the switch, and means connecting the anode of said rectifier device to said control electrode.

6. A multi-channel communication system according to claim 4, wherein each said coincidence switch comprises a gas-filled electron discharge tube having an anode, a cathode and at least one control electrode, a rectifier device, means connecting said first input terminal to the cathode of said rectifier device, means connecting the anode of said rectifier device to said control electrode, a further rectifier device, means connecting said second input terminal of the switch to the anode of said further rectifier device, and means connecting the cathode of said further rectifier device to said control electrode.

7. A multi-channel communication system according to claim 4, wherein each said coincidence switch comprises a gas-filled electron discharge tube having an anode, a cathode and at least one control electrode, a rectifier device, means connecting said first input terminal to the cathode of said rectifier device, means connecting the anode of said rectifier device to said control electrode, a resistive device, and means connecting said resistive device between said second input terminal of the switch and said control electrode.

8. Apparatus according to claim 1 wherein the electrically controllable selector switching device comprises a modulator connected between the signal voltage terminal and the channels, the control circuit comprises means to apply to said modulator pulses of a phase determined by the phase of the pulse from said cancelling circuit, and pulse gates are connected between the output of said modulator and said channels respectively, means being provided to cause different gates to pass pulses of different phases respectively applied thereto from said modulator.

9. Apparatus according to claim 8 wherein the pulse applied to the modulator from the control circuit is identical with the pulse identifying the free channel.

10. Apparatus according to claim 8 wherein the pulses identifying the channels are of relatively low frequency and the pulses applied to the modulator from the control circuit are of relatively high frequency.

11. Apparatus as set forth in claim 1 wherein the electrically controllable selector switching device is operable by differences in pulse phasing and includes a modulator having a control electrode connected to a source of pulses of different phases, the pulse applied to said electrode being associated with a channel identified with the pulse appearing at the second terminal.

12. An apparatus as set forth in claim 11 wherein the pulse applied to the modulator is identical with the pulse identifying the free channel.

References Cited in the file of this patent

UNITED STATES PATENTS

| | | |
|---|---|---|
| 2,537,043 | Pouliart | Apr. 3, 1951 |
| 2,553,605 | Ransom | May. 22, 1951 |
| 2,570,010 | Staal | Oct. 2, 1951 |
| 2,586,825 | Jacobsen | Feb. 26, 1952 |